(12) United States Patent
Chatterjee et al.

(10) Patent No.: US 11,006,401 B2
(45) Date of Patent: May 11, 2021

(54) EARLY TERMINATION OF REPEATED TRANSMISSIONS FOR MTC

(71) Applicant: Apple Inc., Cupertino, CA (US)

(72) Inventors: Debdeep Chatterjee, San Jose, CA (US); Gang Xiong, Beaverton, OR (US); Seunghee Han, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/192,271

(22) Filed: Nov. 15, 2018

(65) Prior Publication Data

US 2020/0305131 A1 Sep. 24, 2020

Related U.S. Application Data

(63) Continuation of application No. 15/517,430, filed as application No. PCT/US2015/059016 on Nov. 4, 2015, now Pat. No. 10,172,127.

(Continued)

(51) Int. Cl.
*H04W 72/04* (2009.01)
*H04L 1/18* (2006.01)
*H04L 1/00* (2006.01)

(52) U.S. Cl.
CPC ......... *H04W 72/042* (2013.01); *H04L 1/0045* (2013.01); *H04L 1/189* (2013.01);
(Continued)

(58) Field of Classification Search
None
See application file for complete search history.

(56) References Cited

U.S. PATENT DOCUMENTS

2009/0168723 A1 7/2009 Meylan
2010/0128687 A1 5/2010 Oteri et al.
(Continued)

FOREIGN PATENT DOCUMENTS

CN 1925383 A 3/2007
CN 101420292 A 4/2009
(Continued)

OTHER PUBLICATIONS

"Chinese Application Serial No. 201580056245.9, Voluntary Amendment filed on Dec. 13, 2017", (VV/0 English Claims), 32 pgs.
(Continued)

*Primary Examiner* — Eunsook Choi
(74) *Attorney, Agent, or Firm* — Kowert, Hood, Munyon, Rankin & Goetzel, P.C.

(57) ABSTRACT

Systems, apparatus, user equipment (UE), evolved node B(eNB), and methods are described for machine-type communications (MTC) with early termination of repeated transmissions. In MTC implementations with narrow bandwidth, significant numbers of retransmissions may be scheduled based on channel quality measurements. If data is successfully decoded at a receiving device while a significant number of retransmissions remain, system resources are wasted. Embodiments described herein thus use downlink control messaging or intermediate hybrid automatic repeat request (HARQ) messaging for early termination of repeated messages.

20 Claims, 13 Drawing Sheets

Related U.S. Application Data

(60) Provisional application No. 62/076,198, filed on Nov. 6, 2014.

(52) U.S. Cl.
 CPC .......... *H04L 1/1861* (2013.01); *H04L 1/1896* (2013.01); *H04W 72/0413* (2013.01); *H04W 72/0446* (2013.01)

(56) References Cited

U.S. PATENT DOCUMENTS

| | | | |
|---|---|---|---|
| 2011/0305213 | A1 | 12/2011 | Lohr et al. |
| 2013/0067293 | A1 | 3/2013 | Somasundaram et al. |
| 2013/0114570 | A1* | 5/2013 | Park ................ H04W 4/70 370/335 |
| 2013/0242889 | A1 | 9/2013 | Khoryaev et al. |
| 2014/0126382 | A1 | 5/2014 | Tian et al. |
| 2014/0177487 | A1 | 6/2014 | Hammarwall et al. |
| 2014/0233470 | A1 | 8/2014 | Kim et al. |
| 2014/0362832 | A1 | 12/2014 | Rudolf et al. |
| 2015/0085796 | A1* | 3/2015 | Xu ................ H04W 72/0493 370/329 |
| 2016/0081122 | A1* | 3/2016 | Tang ................ H04W 72/0413 370/329 |
| 2016/0262182 | A1* | 9/2016 | Yang ................ H04L 1/1858 |
| 2017/0311355 | A1* | 10/2017 | Yi ................ H04J 11/0026 |

FOREIGN PATENT DOCUMENTS

| | | |
|---|---|---|
| CN | 102017691 A | 4/2011 |
| CN | 102158973 A | 8/2011 |
| CN | 102714879 A | 10/2012 |
| CN | 102754380 A | 10/2012 |
| CN | 103906036 A | 7/2014 |
| CN | 107078863 A | 8/2017 |
| EP | 2208302 A2 | 7/2010 |
| JP | 2009239593 A | 10/2009 |
| WO | 2013112703 A2 | 8/2013 |
| WO | 2013127053 A1 | 9/2013 |
| WO | 2013166689 A1 | 11/2013 |

OTHER PUBLICATIONS

"European Application Serial No. 15857380.8, Extended European Search Report dated May 17, 2018", 10 pqs.

"Indian Application Serial No. 201747013586, Voluntary Amendment filed on May 5, 2017", 7 pgs.

Alcatel-Lucent, et al., "Coverage enhancement for physical data & control channel", 3GPP Draft; R1-144076—REL-13 MTC—CE PHY Data & Ctrl Channels V04, 3rd Generation Partnership Project (3GPP), Mobile Competence Centre; 650, Route Des Lucioles; F-06921 Sophia-Antipolis Cedex; F, vol. RAN VVG1, No. Ljubljana, Slovenia, Retrieved from the Internet:<URL:http://www.3gpp.org/ftp/Meetings_3GPPSYNC/RANI/Docs/>[retrieved on Oct. 5, 2014], (Oct. 5, 2014), 5 pgs.

Blackberry UK Limited, "Review of TR 25.702 V12.0.0", 3GPP Draft; R1-134552_ TR_Revievv Final, 3rd Generation Partnership Project [3GPP], Mobile Competence Centre ; 650, Route Des Lucioles; F-06921 SophiaAntipolis Cedex; France vol. RAN VVG1, No. Guangzhou, China;, Retrieved from the Internet:URL:<http://www.3gpp.org/ftp/tsg_ran/VVGI_RLI/TSGRI_74b/Docs/>[retrieved on Sep. 281, 2013, (Sep. 28, 2013), 28 pqs.

"International Application Serial No. PCT/US2015/059016, International Search Report dated Mar. 31, 2016". 3 pgs.

"International Application Serial No. PCT/US2015/059016, Written Opinion dated Mar. 31, 2016", 11 pgs.

Second Office Action in Chinese Application No. 2015800562459 dated Jun. 10, 2020, English translation, 19 pgs.

Decision to Grant in Japanese Application No. 2017-543297, dated Apr. 21, 2020, 3 pgs.

Huawei, HiSilicon, Coverage enhancement for PDSCH and PUSCH [online], 3GPP TSG RAN WG1 meeting #78bis R1-143719, Ljubljana, Slovenia, Oct. 6-10, 2014, 4 pgs.

Notification of Grant, Chinese Application No. 201580056245.9, dated Sep. 1, 2020, 8 pgs.

First Examination Report (FER) in Indian Application No. 201747013586, dated Dec. 21, 2020, 6 pgs.

* cited by examiner

EARLY TERMINATION OF REPEATED TRANSMISSIONS FOR MTC

PRIORITY CLAIM

This application is a continuation of U.S. patent application Ser. No. 15/517,430, filed Apr. 6, 2017, which is a U.S. National Stage Filing under 35 U.S.C. 371 from International Application No. PCT/US2015/059016, filed Nov. 4, 2015 and published in English as WO 2016/073591 on May 12, 2016, which claims the benefit of priority to U.S. Provisional Patent Application Ser. No. 62/076,198 filed on Nov. 6, 2014, and entitled "METHODS FOR SUPPORT OF EARLY TERMINATION OF REPEATED TRANSMISSIONS FOR MTC UES IN ENHANCED COVERAGE MODE", each of which is incorporated herein by reference in its entirety.

TECHNICAL FIELD

Embodiments pertain to systems, methods, and component devices for wireless communications, and particularly to the use of early termination of repeated transmissions with machine type communication (MTC).

BACKGROUND

MTC is an emerging technology related to the concept of the "Internet of Things (IoT)." Existing mobile broadband networks were designed to optimize performance mainly for human communications and thus are not designed or optimized to meet MTC-related requirements.

DETAILED DESCRIPTION

Embodiments relate to systems, devices, apparatus, assemblies, methods, and computer readable media to enhance wireless communications, and particularly to the use of early termination of repeated transmissions with machine type communication (MTC) or extended machine type communication. The following description and the drawings illustrate specific embodiments to enable those skilled in the art to practice them. Other embodiments can incorporate structural, logical, electrical, process, and other changes. Portions and features of some embodiments can be included in, or substituted for, those of other embodiments, and are intended to cover all available equivalents of the elements described.

Figure 1:
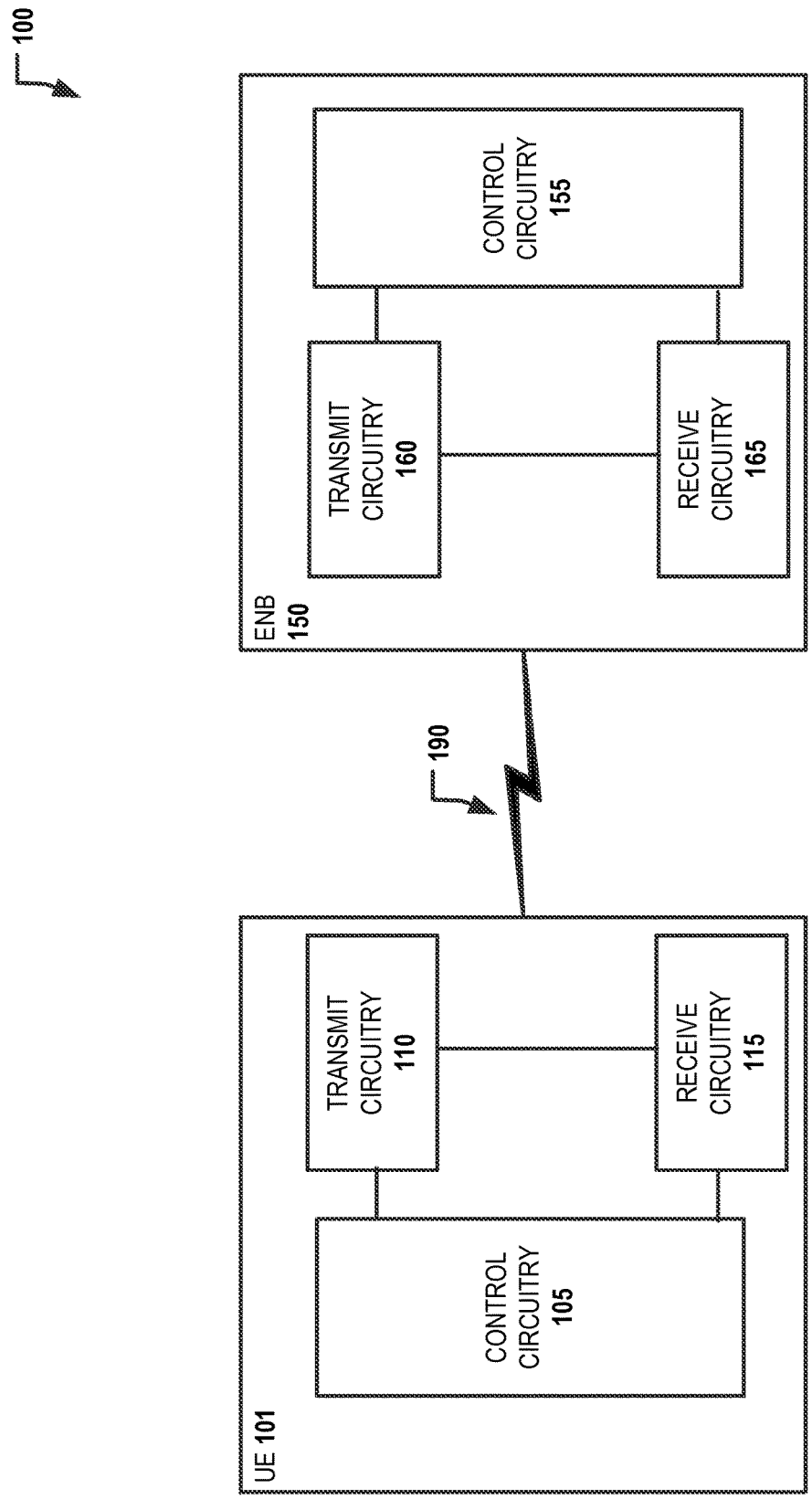
FIG. 1 is a block diagram of a system including an evolved node B (eNB) and user equipment (UE) that may operate with MTC, according to certain embodiments.

FIG. 1 illustrates a wireless network 100, in accordance with some embodiments. The wireless network 100 includes a UE 101 and an eNB 150 connected via an air interface 190.

In some embodiments described herein, UE 101 or a component of UE 101 supports or is configured to support early termination of uplink retransmissions using indication received via Downlink Control Information (DCI) communications.

In some embodiments described herein, eNB 150 or a component of eNB 150 performs or is configured for early termination of uplink retransmissions using DCI communications.

In some embodiments described herein, UE 101 or a component of UE 101 performs or is configured for early termination of downlink retransmissions using intermediate hybrid automatic repeat request (HARQ) acknowledgement (HARQ-ACK) communications.

In some embodiments described herein, eNB 150 or a component of eNB 150 performs or is configured for early termination of downlink retransmissions using intermediate HARQ-ACK communications.

In some embodiments described herein, UE 101 or a component of UE 101 performs or is configured for early termination of uplink retransmissions using intermediate hybrid automatic repeat request (HARQ) acknowledgement (HARQ-ACK) communications, wherein the HARQ-ACK communications may be conveyed using DCI communications.

In some embodiments described herein, eNB 150 or a component of eNB 150 performs or is configured for early termination of uplink retransmissions using intermediate HARQ-ACK communications, wherein the HARQ-ACK communications may be conveyed using DCI communications.

Additional details of such embodiments and further embodiments are described below.

The UE 101 and any other UE in the system may be, for example, laptop computers, smartphones, tablet computers, printers, machine-type devices such as smart meters or specialized devices for healthcare monitoring, remote security surveillance, an intelligent transportation system, or any other wireless devices with or without a user interface. The eNB 150 provides network connectivity to a broader network (not shown) to the UE 101 via the air interface 190 in an eNB service area provided by the eNB 150. In some embodiments, such a broader network may be a wide area network operated by a cellular network provider, or may be the Internet. Each eNB service area associated with the eNB 150 is supported by antennas integrated with the eNB 150. The service areas are divided into a number of sectors associated with certain antennas. Such sectors may be physically associated with fixed antennas or may be assigned to a physical area with tunable antennas or antenna settings adjustable in a beamforming process used to direct a signal to a particular sector. One embodiment of the eNB 150, for example, includes three sectors each covering a 120 degree area with an array of antennas directed to each sector to provide 360 degree coverage around the eNB 150.

The UE 101 includes control circuitry 105 coupled with transmit circuitry 110 and receive circuitry 115. The transmit circuitry 110 and receive circuitry 115 may each be coupled with one or more antennas. The control circuitry 105 may be adapted to perform operations associated with MTC. In some embodiments, the control circuitry 105 of the UE 101 may perform calculations or may initiate measurements associated with the air interface 190 to determine a channel quality of the available connection to the eNB 150. These calculations may be performed in conjunction with control circuitry 155 of the eNB 150. The transmit circuitry 110 and receive circuitry 115 may be adapted to transmit and receive data, respectively. The control circuitry 105 may be adapted or configured to perform various operations such as those described elsewhere in this disclosure related to a UE. The transmit circuitry 110 may transmit a plurality of multiplexed uplink physical channels. The plurality of uplink physical channels may be multiplexed according to time division multiplexing (TDM) or frequency division multiplexing (FDM). The transmit circuitry 110 may be configured to receive block data from the control circuitry 105 for transmission across the air interface 190. Similarly, the receive circuitry 115 may receive a plurality of multiplexed downlink physical channels from the air interface 190 and relay the physical channels to the control circuitry 105. The uplink and downlink physical channels may be multiplexed according to TDM or FDM. The transmit circuitry 110 and the receive circuitry 115 may transmit and receive both control data and content data (e.g. messages, images, video, et cetera) structured within data blocks that are carried by the physical channels.

FIG. 1 also illustrates the eNB 150, in accordance with various embodiments. The eNB 150 circuitry may include control circuitry 155 coupled with transmit circuitry 160 and receive circuitry 165. The transmit circuitry 160 and receive circuitry 165 may each be coupled with one or more antennas that may be used to enable communications via the air interface 190.

The control circuitry 155 may be adapted to perform operations associated with MTC. The transmit circuitry 160 and receive circuitry 165 may be adapted to transmit and receive data, respectively, within a narrow system bandwidth that is narrower than a standard bandwidth structured for person to person communication. In some embodiments, for example, a transmission bandwidth may be set at or near 1.4 MHz. In other embodiments, other bandwidths may be used. The control circuitry 155 may perform various operations such as those described elsewhere in this disclosure related to an eNB.

Within the narrow system bandwidth, the transmit circuitry 160 may transmit a plurality of multiplexed downlink physical channels. The plurality of downlink physical channels may be multiplexed according to TDM or FDM. The transmit circuitry 160 may transmit the plurality of multiplexed downlink physical channels in a downlink super-frame that is comprised of a plurality of downlink subframes.

Within the narrow system bandwidth, the receive circuitry 165 may receive a plurality of multiplexed uplink physical channels. The plurality of uplink physical channels may be multiplexed according to TDM or FDM. The receive circuitry 165 may receive the plurality of multiplexed uplink physical channels in an uplink super-frame that is comprised of a plurality of uplink subframes.

As described further below, the control circuitry 105 and 155 may be involved with measurement of a channel quality for the air interface 190. The channel quality may, for example, be based on physical obstructions between the UE 101 and the eNB 150, electromagnetic signal interference from other sources, reflections or indirect paths between the UE 101 and the eNB 150, or other such sources of signal noise. Based on the channel quality, a block of data may be scheduled to be retransmitted multiple times, such that the transmit circuitry 110 may transmit copies of the same data multiple times and the receive circuitry 115 may receive multiple copies of the same data multiple times.

While repeated transmission of a block of data may be used to ensure that the data is received correctly, the repeated transmission can consume significant resources. In some embodiments, for example, each block of data may be scheduled for 50 or 100 retransmissions based on the measured quality of channels across the air interface 190. Reducing unnecessary transmissions is one way to improve the performance of MTC communications, particularly with integration into current and next generation mobile broadband networks such as long term evolution (LTE) and LTE-Advanced.

The existing mobile broadband networks were designed to optimize performance mainly for human communications and thus are not designed or optimized to meet MTC-related considerations. Some MTC systems are structured to lower human communication aspects and instead to focus on lower device cost, enhanced coverage, and reduced power consumption. Embodiments described herein operate to reduce cost and power consumption. In some implementations of embodiments described herein, bandwidth for an MTC system is reduced, for example, to 1.4 MHz, the minimum bandwidth for an LTE system. In such implementations, the transmission bandwidth for both control and data channels can be reduced to 1.4 MHz. In some embodiments, a large number of MTC devices will be deployed in a system for specific services within one cell. When such a massive number of MTC devices attempt to access and communicate with the network, multiple MTC regions with 1.4 MHz bandwidth can be allocated by an eNB. In other embodiments, other bandwidths may be used.

In some embodiments, coverage enhancement may be implemented with reduced bandwith and repetition of data across multiple subframes for various physical channels so that the energy can be accumulated at the receiver side. However, using a large number of repeated transmissions across multiple subframes increases the system resource usage inefficiency, and thereby reduces system spectral efficiency. MTC UE power consumption is increased with increasing number of retransmissions, which contradicts MTC UE power consumption reduction goals which are 3GPP enhancement targets. In some embodiments, for example, a single block of data may be retransmitted 50 or 100 times in order to achieve correct decoding at a receiver.

Embodiments described herein thus operate to improve resource usage in the number of repetitions across subframes in a way that is targeted specifically for different channels and signals in a UE-specific manner. In the embodiments described herein, depending on instantaneous channel conditions, a receiver may be able to successfully decode the transmitted transport blocks with fewer repeated transmissions for the initial transmission or retransmission than the number of repeated transmissions used at the transmitter side. To improve resource usage, embodiments described herein use early termination of transmission of physical channels, whereby the transmitter is informed that the data has been successfully decoded before the set number of retransmissions occurs. The transmitter then terminates the scheduled repeated transmissions of the initial transmission or retransmission before the actual number of repetitions originally intended based on long-term channel conditions or the enhanced coverage level needed for the particular UE for a given physical channel.

Embodiments described herein realize the above concept of early termination of repeated transmissions. Embodiments are described largely within the context of uplink and downlink shared channels, but may be used with different channels in different embodiments. Embodiments described herein may particularly include early termination of physical uplink shared channel (PUSCH) repetitions from the UE 101 based on Layer 1 control signaling from the eNodeB 150 using downlink control information (DCI) format 0 in a way that is supported by similar SPS release indications. Additional embodiments described herein implement early termination of physical downlink shared channel (PDSCH) and PUSCH repetitions based on an enhanced HARQ feedback scheme, wherein the MTC UE 101 in enhanced coverage (EC) mode transmits HARQ-ACK feedback at intermediate HARQ-ACK feedback opportunities within the repeated transmission time window. Early termination using HARQ-ACK feedback may be used to terminate both uplink transmissions from the UE 101 to the eNB 150 and downlink transmissions from the eNB 150 to the UE 101

Such embodiments include benefits above and beyond the use of Physical Hybrid ARQ Indicator Channel (PHICH) signaling PUSCH transmissions. In particular, PHICH is not suitable for early termination as described herein when used directly for early termination as the system will not know which PUSCH transport block the early termination is intended for. In particular, intermediate HARQ-ACK feedback that is transmitted before the expected HARQ-ACK feedback in the absence of early termination sent via PHICH can generate confusion about which PUSCH transport block a particular HARQ-ACK message is associated with.

Thus, in accordance with the above, in some embodiments, the transmit circuitry 110 and receive circuitry 115 may transmit and receive, respectively, early or intermediate HARQ-ACK messages associated with early termination of transmissions in addition to standard HARQ-ACK and/or negative acknowledgement (NACK) messages across the air interface 190 according to a predetermined HARQ message schedule. Similarly, the transmit circuitry 160 and receive circuitry 165 may transmit and receive, respectively, early or intermediate HARQ-ACK messages as well as the standard HARQ-ACK and/or NACK messages across the air interface 190. A predetermined HARQ message schedule for standard HARQ-ACK messages may indicate uplink and/or downlink frames in which the HARQ-ACK and/or NACK messages are to appear. Intermediate HARQ-ACK messages, however, may be associated with a different schedule, with an optional timing, or with no schedule in various embodiments as described further below.

MTC is therefore implemented across the air interface 190 using the circuitry of the UE 101 and the eNB 150. MTC enables a ubiquitous computing environment to enable devices to efficiently communicate with each other. IoT services and applications stimulate the design and development of MTC devices to be seamlessly integrated into current and next generation mobile broadband networks, such as long term evolution (LTE) and LTE-Advanced communication systems that operate according to third generation partnership project (3GPP) standards (e.g., 3GPP LTE Evolved Universal Terrestrial Radio Access (E-UTRA) Physical Layer Procedures (Release 12) Sep. 26, 2014). As mentioned above, the early termination embodiments described herein may then be integrated on top of such a standard, or may be implemented with minor changes to such a standard in various different embodiments.

Embodiments described herein particularly reduce cost and power consumption by reducing the system bandwidth, which corresponds to roughly a single Physical Resource Block (PRB) of existing LTE design. This cellular IoT using reduced system bandwidth could potentially operate in a re-allocated global system for mobile communications (GSM) spectrum, within the guard bands of an LTE carrier, or in a dedicated spectrum.

Although the embodiments described below use a 1.4 MHz bandwidth, the design may be extended to other narrow bandwidths (e.g., 1.5 MHz, 1 MHz, 2 MHz, 200 KHz, 180 KHz, et cetera). In addition, MTC is used as the initial target application for the proposed embodiments, but it will be apparent that embodiments may be extended to other narrow-band deployed applications, (e.g., Device-to-Device communications, hybrid IoT networks, et cetera).

Various physical channels may be used as part of such an MTC, including different channels for both download and upload paths across the air interface 190. These physical channels include, but are not limited to, a synchronization channel (SCH), a physical broadcast channel (PBCH), a control channel, a physical downlink shared channel (PDSCH), a physical random access channel (M-PRACH), a physical uplink control channel (PUCCH), and a physical uplink shared channel (PUSCH). These channels and other potential channels are described below. The MTC Synchronization Channel (SCH) may include the MTC Primary Synchronization Signal (PSS) and/or MTC Secondary Synchronization Signal (SSS). It may be used to support time and frequency synchronization and provide the UE with the physical layer identity of the cell and the cyclic prefix length. Note that the SCH may or may not be utilized to distinguish a Frequency Division Duplex (FDD) and Time Division Duplex (TDD) system, although the TDD may not be supported in some MTC systems. The MTC Physical Broadcast Channel (PBCH) carries an MTC Master Information Block (MIB), which consists of a limited number of the most frequently transmitted parameters for initial access to the cell. The MTC control channel includes an MTC Physical Downlink Control Channel (M-PDCCH) that may be based on the LTE Physical Downlink Control Channel (PDCCH) or Enhanced Physical Downlink Control Channel (EPDCCH) designs. The PRACH is used to transmit the random access preamble. For initial access, it is utilized to achieve uplink synchronization. The PUCCH is used to carry UCI. In particular, scheduling requests and HARQ acknowledgments for received SCH transport blocks can be supported in PUCCH transmission. An MTC Physical Multicast Channel (PMCH) is used to support Multimedia Broadcast and Multicast Services (MBMS).

The PDSCH is used for all user data transmitted between the UE 101 and the eNB 150 across the air interface 190, as well as for broadcast system information which is not carried on the PBCH, and for paging messages. The PUSCH is used for uplink data transmission. As mentioned above, embodiments described herein primarily relate to early termination of retransmissions for blocks of data sent via the PDSCH and PUSCH as primary physical channels for data. In other embodiments, any channel mentioned above, or other channels in other systems, may use early termination of retransmissions as described herein.

Figure 2:
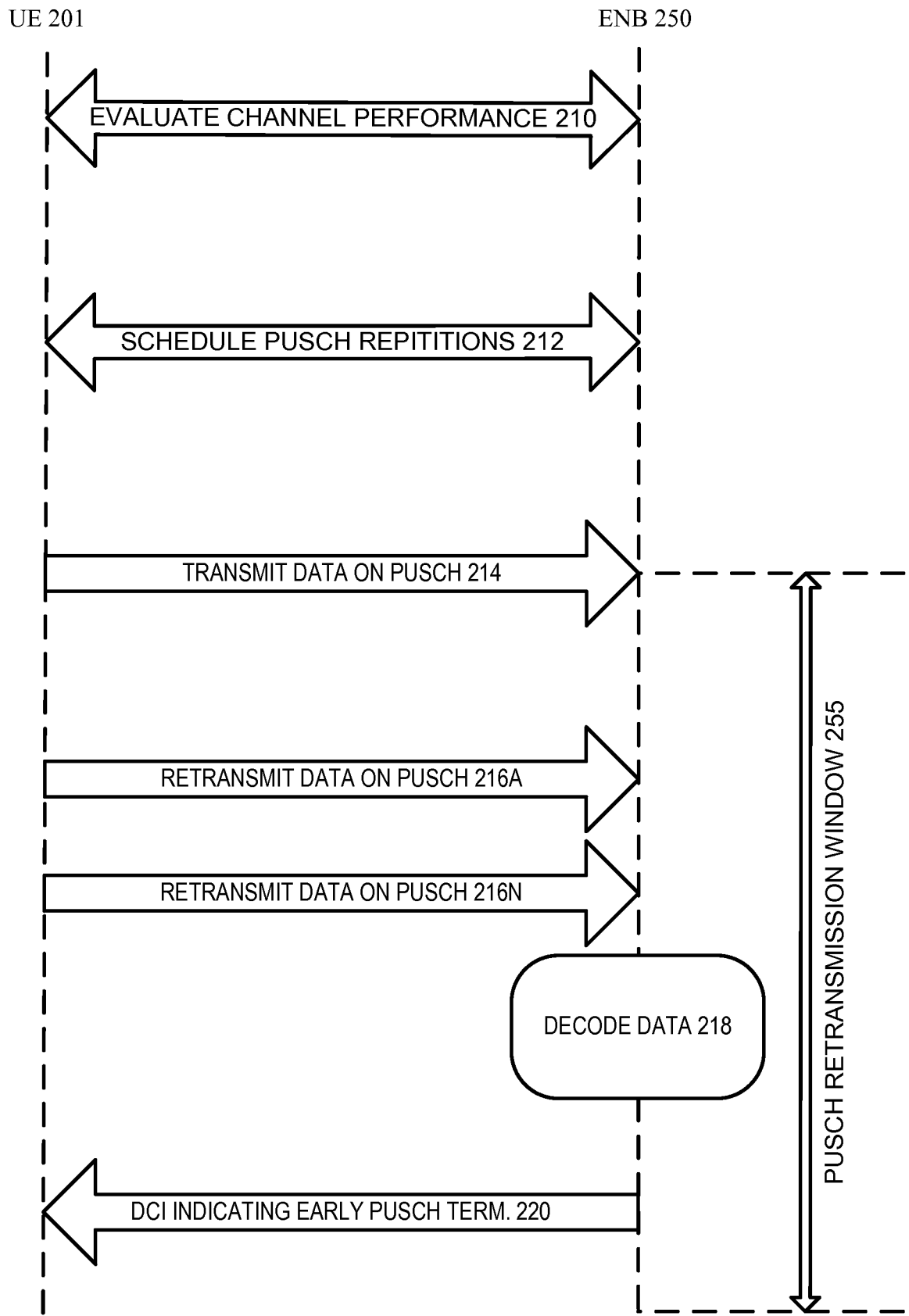
FIG. 2 illustrates aspects of system operation with early termination of repeated transmissions with MTC communications, according to certain embodiments.

FIG. 2 illustrates aspects of system operation with early termination of repeated transmission with MTC communications, according to certain embodiments. In particular, FIG. 2 shows early termination of an uplink communication from UE a 201 to an eNB 250 using DCI layer 1 control signaling.

Early termination of PUSCH repetitions can be realized by informing the UE 201 of successful reception of the PUSCH transmissions even before the PUSCH repetition window for the initial transmission or any retransmission. The eNB 250 can use layer 1 downlink control signaling to inform the UE 201 to terminate the repeated transmission for a given transport block. In some embodiments, this is achieved by reusing the DCI format 0. In other embodiments, newly designed DCI formats are used. In this invention, the reference to "DCI format 0" is intended to imply the use of the DCI format used to carry the uplink scheduling information (uplink grant) to MTC UEs—this may be a new DCI format designed for MTC UEs designed based on DCI format 0. In contrast, the "newly designed DCI formats", as elaborated in the sequel, refer to design of DCI formats customized to carry the HARQ-ACK or, in general, the early termination indication information.

FIG. 2 thus begins with operation 210, where channel conditions and performance are evaluated between the UE 201 and the eNB 250. Based on the results of the channel performance measured in operation 210, repeated transmissions of uplink data from the UE 201 to the eNB 250 are set and scheduled at operation 212, as information is set to be communicated to the eNB 250 from the UE 201. This essentially sets a retransmission window 255. The retransmission window 255 may be based on a scheduling time (e.g. 10 milliseconds, 50 milliseconds, et cetera), or may be directly associated with a set number of retransmissions (e.g. 10, 50, 100, et cetera). An initial transmission of the data occurs in operation 214, and retransmission of copies of the same data occurs in operations 216A through 216N. In some embodiments, these retransmission communications are not the only communications on a link between the UE 201 and the eNB 250, but may be transmissions that occur between other data transmissions or control channel transmissions on the PUSCH or any other channel described above. In some embodiments, for example, additional channel measurement communications may be made while operations 216A-N are occurring, such that channel status and scheduling for future PUSCH retransmissions is changed, or other aspects of UE 201 and eNB 250 communications are adjusted. Eventually, the eNB 250 successfully decodes the data from the PUSCH retransmissions in operation 218. In a system with no early termination of retransmissions, the UE 201 would simply continue transmitting copies of the data on the PUSCH until the set number of retransmissions had occurred. A standard HARQ-ACK or NACK acknowledging successful receipt or requesting an additional retransmission would then occur at the end of the retransmission window 255. In embodiments described herein, however, when the PUSCH data is successfully decoded before the end of the retransmission window 255, a DCI message indicating early termination of retransmissions is sent from the eNB 250 to the UE 201 in operation 220. This stops any remaining retransmissions from the UE 201, thereby saving power and freeing up transmission resources. In some embodiments, the eNB 250 may determine an amount of time or a number of retransmissions remaining in the retransmission window 255 after the PUSCH data is successfully decoded in operation 218. If a threshold amount of time or number of retransmissions remains, operation 220 may be initiated, but if the threshold is not met, the system may simply allow the retransmission operations to occur with no early termination. In some embodiments, a calculation of resource savings may be performed, including resources consumed in sending the DCI and resources saved following reception of the DCI at the UE 201 in operation 220, with operation 220 to be performed if a threshold amount of resource savings is estimated.

Figure 3:
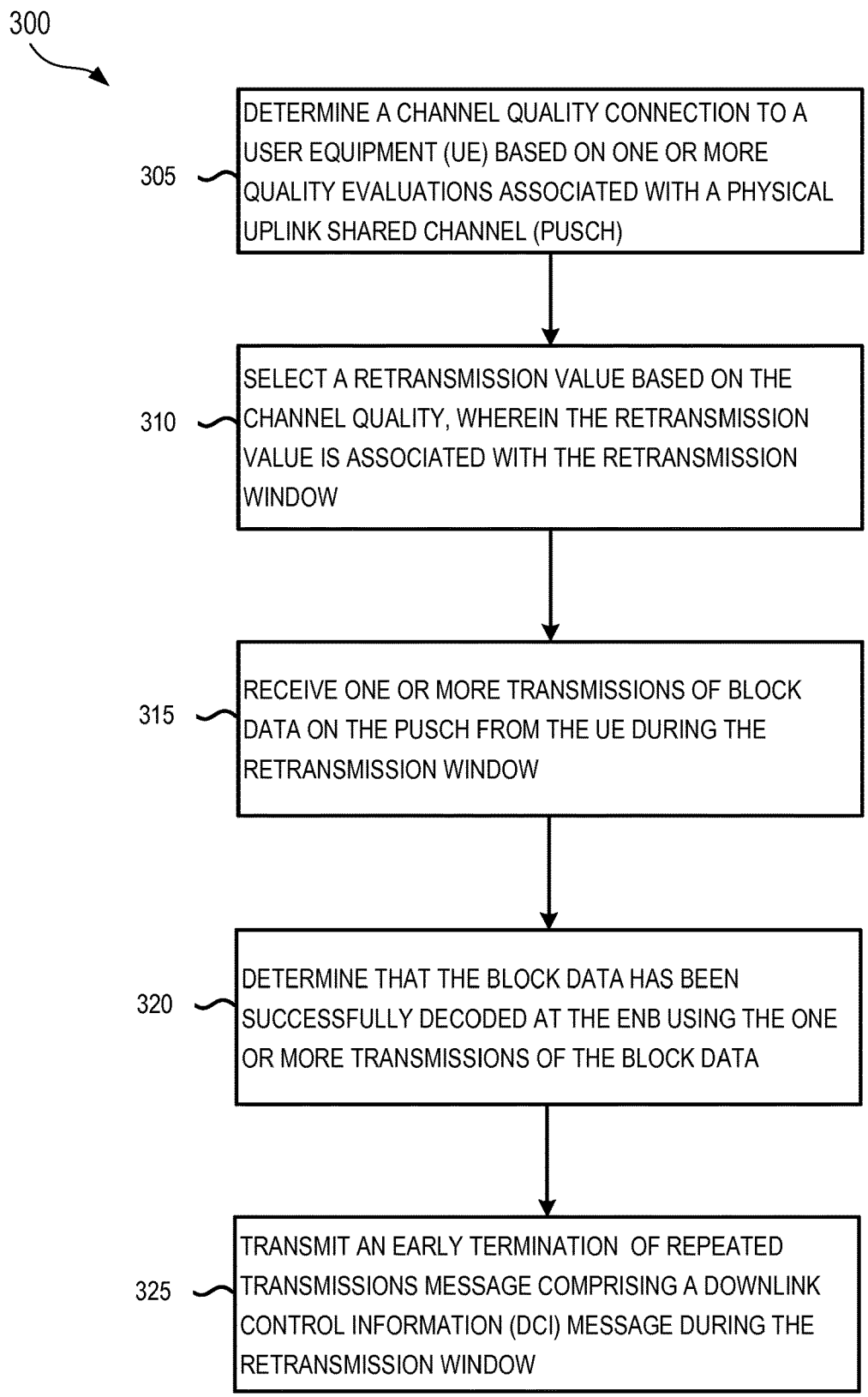
FIG. 3 describes a method for early termination of repeated transmissions, according to some example embodiments.

FIG. 3 describes a method for early termination of repeated transmissions, according to some example embodiments. FIG. 3 describes an uplink communication from a UE such as the UE 101 or the UE 201 to an eNB such as the eNB 150 or the eNB 250. In some embodiments, a non-transitory computer readable medium comprises instructions that, when executed by one or more processors, configure an eNB 150 for machine-type communications to perform the method 300. In other embodiments, an eNB such as the eNB 150 or the eNB 250 performs the method 300 in conjunction with a corresponding UE.

A particular eNB may simultaneously perform the method 300 with many different UEs at the same time in some embodiments. The method 300 begins with operation 305, which involves determining a channel connection quality to a user equipment (UE) based on one or more measurements associated with a Physical Uplink Shared Channel (PUSCH). This may, in some embodiments, be managed by the control circuitry 155 scheduling and processing measurement communications across the air interface 190 to the UE 101.

Following the measurement in operation 305, a retransmission value based on the channel quality is selected in operation 310, wherein the retransmission value is associated with a retransmission window. As discussed above, the retransmission window may be based on a number of selected retransmissions or another retransmission value. In some embodiments, a table or some other calculated operation may be used to select a number of retransmissions according to one or more measured quality or noise characteristics for an air gap used for a channel between the eNB performing the method 300 and an associated UE. The retransmission value may be selected by the eNB, or may be set at a UE using a retransmission value selected at the eNB and then communicated to the UE.

After the UE begins transmissions and subsequent retransmissions of the data block, the eNB receives one or more transmissions of the block data on the PUSCH from the UE during the retransmission window in operation 315. As the block data is received, the eNB aggregates the energy from the transmissions and processes them to identify symbols and decode the transmission. As additional retransmissions are received, the eNB attempts to use the additional transmissions if the previous transmissions have not been sufficient for a successful decoding. Operation 320 involves determining that the block data has been successfully decoded at the eNB using the one or more transmissions of the block data. Once the successful decoding has occurred, this prompts the eNB, at operation 325, to terminate the retransmissions from the UE by transmitting an early termination of repeated transmissions message comprising a downlink control information (DCI) message during the retransmission window. As mentioned above, in some embodiments, a determination may be made that the retransmission window is nearly over and that the early termination of repeated transmissions message should not be sent, but that the system will simply use a standard scheduled HARQ-ACK/NACK message. In some embodiments, if an initial set of retransmissions was not successful, a HARQ-NACK message will be sent at the end of the retransmission window, and another set of retransmissions will begin. If the block data is successfully decoded before the second retransmission window is over, then operations 320 and 325 may be performed following the HARQ-NACK message and the second set of retransmissions or the beginning of the second set of retransmissions if the communication is successfully decoded during the second set of transmissions. In other embodiments, other operations may similarly be performed between the described operations.

Figure 4:
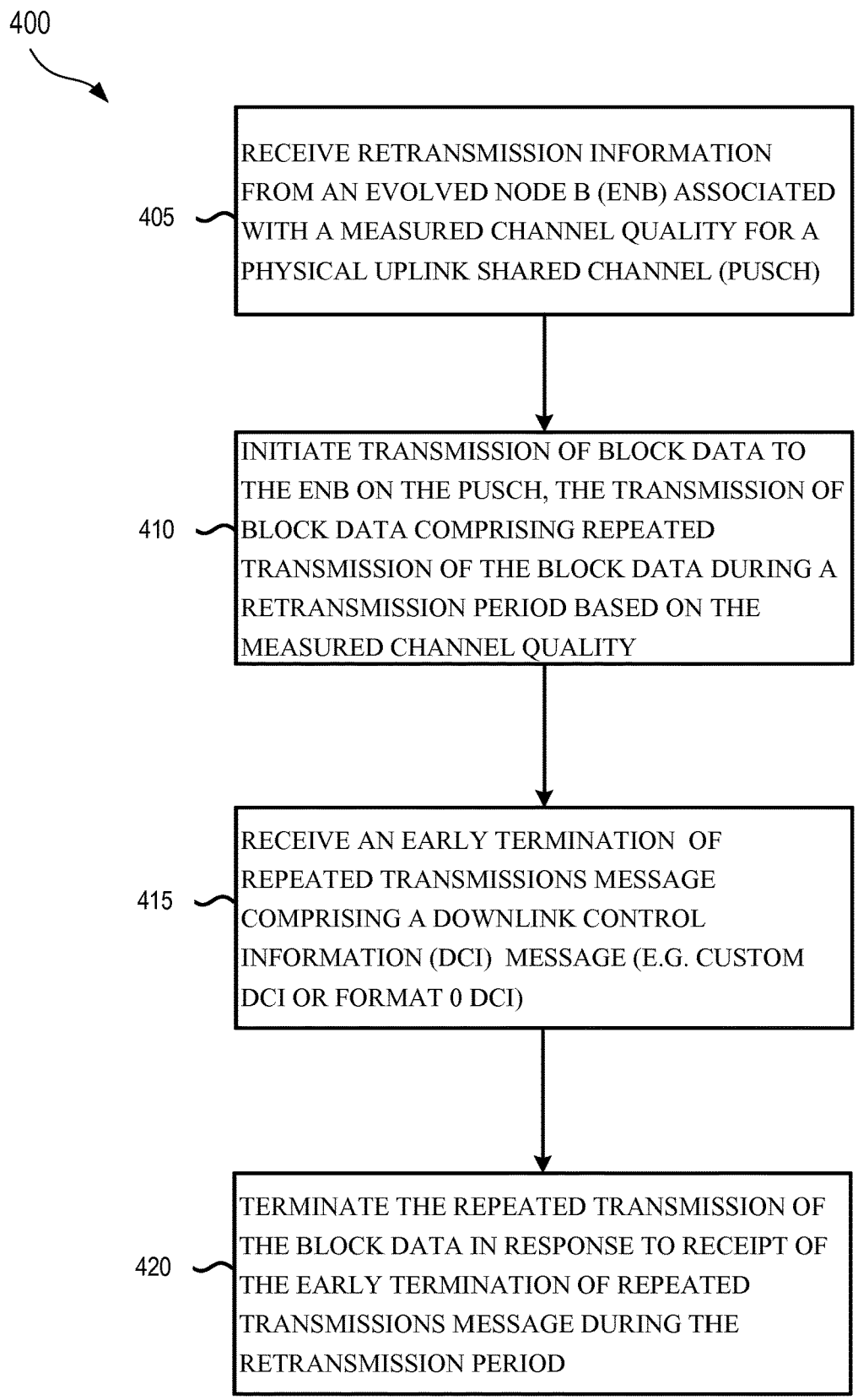
FIG. 4 describes a method for early termination of repeated transmissions, according to some example embodiments.

FIG. 4 describes a method 400 that may be performed by a UE corresponding to the UE of the method 300 communicating with the eNB performing the method 300. Just as above for method 300, in some embodiments, a non-transitory computer readable medium comprises instructions that, when executed by one or more processors, configure a UE for MTC to perform the method 400. In other embodiments, a UE such as the UE 101 or the UE 201 perform the method 400 in conjunction with a corresponding eNB. In some embodiments, the method 400 may be performed by a processing integrated circuit apparatus of a mobile device in order to manage wireless communications from the UE to a cellular network made up of many eNBs. In such embodiments, the method 400 may be performed by a single integrated circuit managing operations of the mobile device.

The method 400 begins with operation 405, in which an apparatus of a UE is configured to receive retransmission information from an eNB associated with a measured channel quality for a Physical Uplink Shared Channel (PUSCH). This retransmission information may be measurement data that can be used by the UE to select a number of retransmissions, or may be a number of retransmissions selected by the eNB for the UE. In other embodiments, this may be any other intermediate or final information used for a retransmission window.

In operation 410, the UE initiates transmission of block data to the eNB on the PUSCH, with the transmission of the block data comprising repeated transmission of the block data during a retransmission period based on the measured channel quality. In operation 415, the UE receives an early termination of repeated transmissions message comprising a downlink control information (DCI) format 0 message or a custom DCI message. This message is based on the eNB successfully decoding the block data prior to the end of a retransmission window.

The UE then, based on the message from operation 415, terminates the scheduled repeated transmission of the block data in operation 420 in response to receipt of the early termination of repeated transmissions message during the retransmission period.

This use of DCI for early termination may be considered to be similar to usage of DCI format 0 in semi-persistent scheduling (SPS) release PDCCH validation. In such embodiments, the UE validates reception of such a DCI format 0 transmission as an indication of early termination of transmission of copies of the transport block corresponding to the PUSCH transmission whose first subframe satisfies a specified time relationship with respect to the reception time of this DCI format 0 transmission. In one particular embodiment, a first subframe of a downlink control channel transmission is in a particular timing position to include the DCI format 0 communication. In these various embodiments, the DCI communication carries data indicating early termination.

In some embodiments, the DCI communication association with early termination of repeated transmissions is made only if a certain number of conditions are satisfied. A first condition is that the CRC parity bits of the downlink control channel payload are scrambled with theC-RNTI or a similar identification number. Another condition is that a new data indicator value of the format 0 DCI is set to zero.

In still further embodiments, in addition to the conditions above, the conditions described in table 1 below are also used.

TABLE 1

| Field | DCI format 0 |
| --- | --- |
| TPC command for scheduled PUSCH | set to '00' |
| Cyclic shift DM RS | set to CS_val |
| Modulation and coding scheme and redundancy version | set to '11111' |
| Resource block assignment and hopping resource allocation | Set to all '1's |

Table 1 thus shows special fields for indication of early termination of PUSCH repeated transmissions, according to some embodiments. In Table 1, CS_val is an originally assigned DM-RS cyclic shift value.

In certain other embodiments, instead of using a specified time relationship between the first subframe of the PUSCH transmission and the downlink control channel transmission indicating early termination of repeated transmissions, an HARQ process number can be used. Such an HARQ process number may be used to identify block data for PUSCH transmissions. This identification by an HARQ process number can be introduced to enable the UE to identify the appropriate block of data for which the early termination of repeated transmissions is indicated. In other words, multiple blocks of data may be communicated during interleaved retransmission windows. Because of this, an early termination of retransmissions system needs to be able to distinguish between different blocks of data which are being retransmitted. The use of an HARQ process number to identify blocks of data may enable the system to distinguish between these different blocks of data. This use of an HARQ process number adds additional flexibility in transmitting the early termination indication in an asynchronous manner but is associated with additional changes to the DCI format in order to enable a new field for the HARQ process number.

In still other embodiments, rather than using the DCI format 0, a new DCI format can be defined. In some such embodiments, an MTC-specific DCI format can be used to inform UEs in an enhanced coverage mode of the early termination of PUSCH transmissions. Such a compact DCI format may contain the HARQ process number as described above. Other embodiments of such a compact new DCI format may include a cyclic shift bit field and/or an NDI field. The reduced size of such a compact DCI format may help to reduce the number of repetitions for PDCCH or EPDCCH data transmissions and may consequently allow MTC UEs in enhanced coverage mode to quickly receive the DCI indicating early termination indication for PUSCH repetitions.

For UEs in an enhanced coverage mode, the starting subframe of an EPDCCH transmission is limited to a subset of subframes in order to reduce the blind decoding attempts of EPDCCH by UEs, which consume power. When an eNB successfully decodes the PUSCH transmission, in some embodiments described herein, the eNB will start to transmit the EPDCCH transmission in the next available specified starting subframe, or according to a repetition level for the EPDCCH transmission that can be derived or set according to predefined or configured mapping rules for UE-specific coverage extension levels.

Further, in some embodiments operating in half-duplex frequency domain duplexing (HD-FDD) with low complexity UEs in EC mode, the PUSCH retransmission window can be interspersed with downlink subframes. In other words, during the retransmission window, the retransmission widow may be extended by the presence of downlink subframes on a shared channel during retransmission of the block data. This enables a UE to receive layer 1 control signaling indicating early termination of repeated transmissions within a retransmission window by using downlink frames that are otherwise scheduled for HD-FDD operation.

Figure 5:
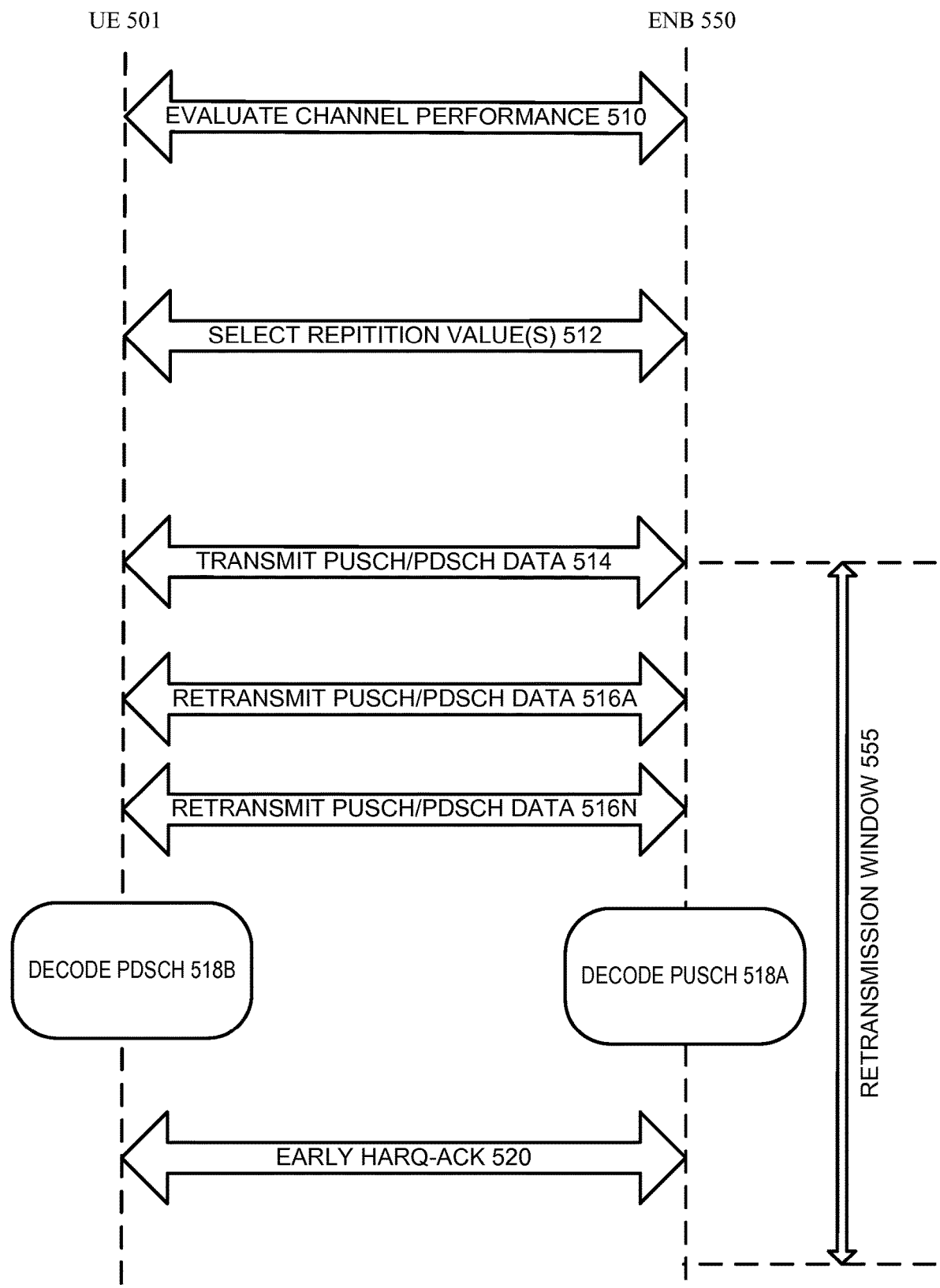
FIG. 5 illustrates aspects of system operation with early termination of repeated transmissions with MTC communications, according to certain embodiments.

FIG. 5 illustrates aspects of system operation with early termination of repeated transmissions with MTC communications, according to certain embodiments. In particular, FIG. 5 illustrates the use of early or intermediate hybrid automatic repeat request (HARQ) acknowledgement (HARQ-ACK) operation in a system with early termination of repeated transmissions, according to certain embodiments. A UE 501 and An eNB 550 may, in some embodiments, be similar to the UE 101 and the eNB 150 of FIG. 1, or any other UE or eNB described herein. As mentioned above, while embodiments using DCI messaging, including DCI format 0 messaging, may terminate uplink retransmissions from a UE to an eNB, the use of early HARQ-ACK messaging may be used to terminate both uplink and downlink retransmissions. Further, various embodiments may use both DCI messaging and early HARQ-ACK messaging for uplink and/or downlink termination of repeated messages. In one such embodiment, the HARQ-ACK messaging in response to PUSCH transmissions may be indicated using DCI carried by the M-PDCCH. Thus, in some implementations, the embodiments described with respect to FIG. 2 may be combined with the embodiments described with respect to FIG. 5.

Similar to the system operation of FIG. 2, FIG. 5 begins with the UE 501 and the eNB 550 measuring channel performance and selecting repetition values based on the channel performance in operations 510 and 512. The measured channel performance is used to establish a retransmission window 555 for retransmission of particular blocks of data. In embodiments that use both DCI and early HARQ-ACK repetition termination, the same channel performance measurements may be used in systems that perform the operations of both FIG. 2 and FIG. 5.

In operations 514 and 516A-N, an initial transmission of block data and subsequent retransmissions are performed. If the data is PUSCH data, it is decoded by the eNB 550 in operation 518A, whereas PDSCH data is decoded by the UE 501 in operation 518B. Whichever device verifies that the data has been correctly decoded during retransmission window 555 then initiates communication of an early HARQ-ACK message in operation 520 to let the other device know that the additional scheduled retransmissions are not needed.

Figure 6A:
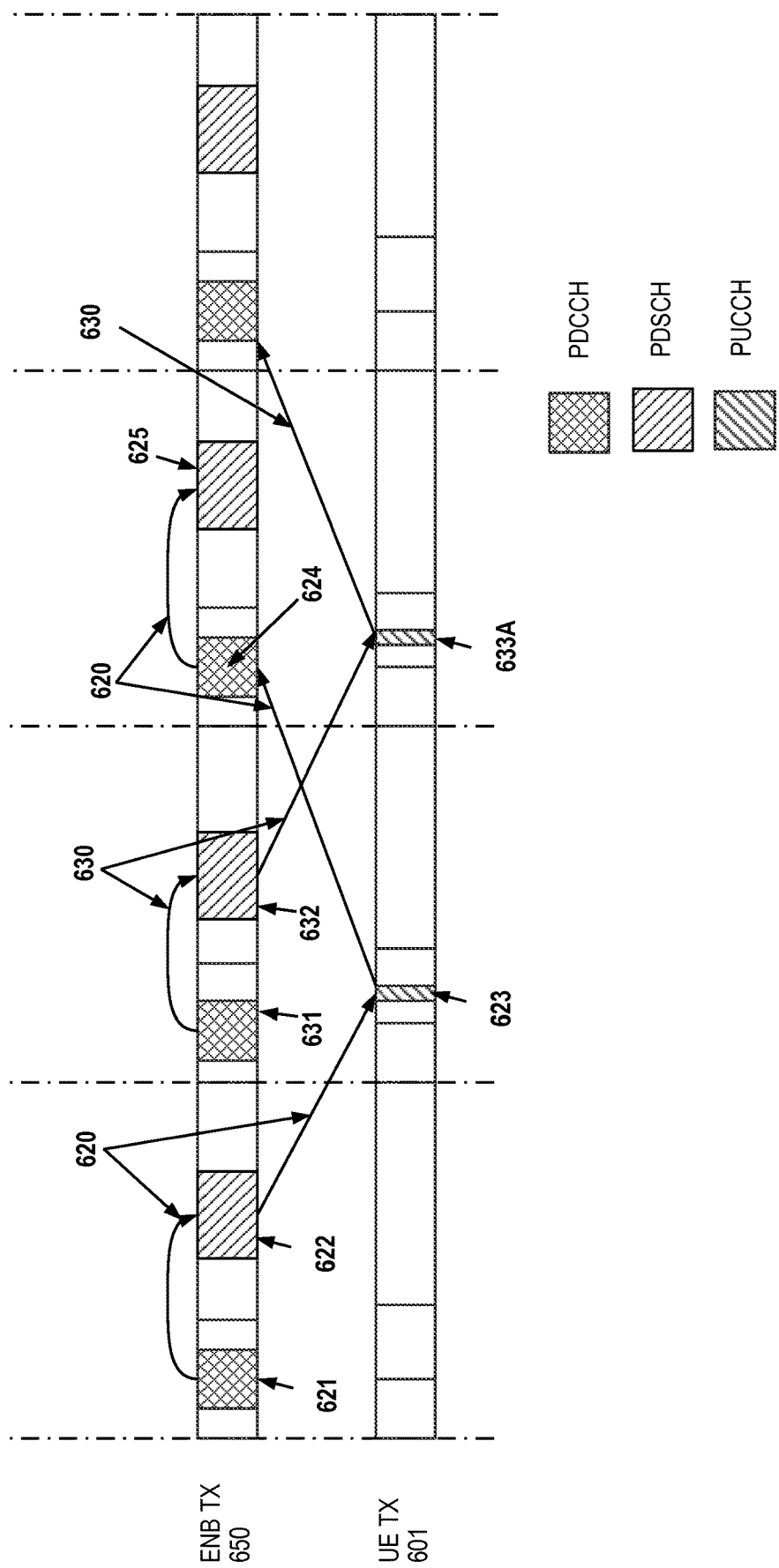
FIG. 6A illustrates aspects of intermediate hybrid automatic repeat request (HARQ) acknowledgement (HARQ-ACK) operation in a system with early termination of repeated transmissions, according to certain embodiments.

FIG. 6A illustrates aspects of HARQ-ACK operation, as well as the use of HARQ process numbers or process identifiers to track transmission of data. FIG. 6A shows transmissions (TX) 650 and 601 for both an eNB and a UE, respectively, which may be similar to any UE or eNB described herein, including the UE 501, 101, and 201 as well as the eNB 550, 150, and 250.

As illustrated, a PDCCH 621 may transmit control data associated with a PDSCH 622. The PDCCH 621 may essentially schedule transmission of data on the PDSCH 622, which may be tracked by an HARQ process number 620 associated with all the processes of transmission of a particular set of data. An HARQ process number 630 similarly tracks the processes for a different set of data. Although not illustrated, each transmission is associated with corresponding receptions in the other device, such that the PDSCH 622 data is transmitted from an eNB and received at a UE.

After a standard scheduled set of retransmissions associated with the data in the PDSCH 622, which may include retransmissions on additional scheduled frames of the PDSCH, the UE TX 601 may include a PUCCH 623 communicating either an HARQ-ACK or NACK to let the eNB know whether the data from the PDSCH 622 was received successfully. In the illustrated example of FIG. 6A, the PUCCH 623 includes an HARQ-NACK indicating that the data from the PDSCH 622 was not successfully decoded, and so the HARQ process number 620 is then associated with additional scheduling and transmission of the same data in a PDCCH 624 and a PDSCH 625.

By contrast, a PUCCH 633A may be identified as including an HARQ-ACK identifying that the data from a PDSCH 632 scheduled by a PDCCH 631 was successfully received, since there is no additional scheduling of a subsequent PDSCH as part of the transmission associated with a HARQ process number 630.

While the transmission channels are shown on a timeline in FIG. 6A, in various embodiments, additional retransmissions may be included as part of any transmission process illustrated in FIG. 6A as described above. Thus, in some embodiments, additional frames of data including retransmission of the data associated with the HARQ process number 620 may be transmitted between the PDSCH 622 and the PUCCH 623. Similarly, additional frames including retransmission data associated with the HARQ process number 630 may be transmitted between the PDSCH 632 and the PUCCH 633A. Additionally, it should be noted that in such embodiments as well as in the embodiment specifically illustrated in FIG. 6A, transmissions associated with the different HARQ process numbers 620 and 630 are active in the system at the same time, such that in some embodiments, the PUCCH 623 may occur after the PUCCH 633A when the PDSCH 622 occurs before the PDSCH 632. This is the source of the need for HARQ process tracking or timing of DCI messages used in early termination of repeated transmissions, since the device performing the repeated transmissions needs to know which retransmission process to terminate.

The above description of FIG. 6A describes standard HARQ-ACK/NACK messaging, which is scheduled by a system when the number of retransmissions is set prior to the first copy of a data block being transmitted.

Figure 6B:
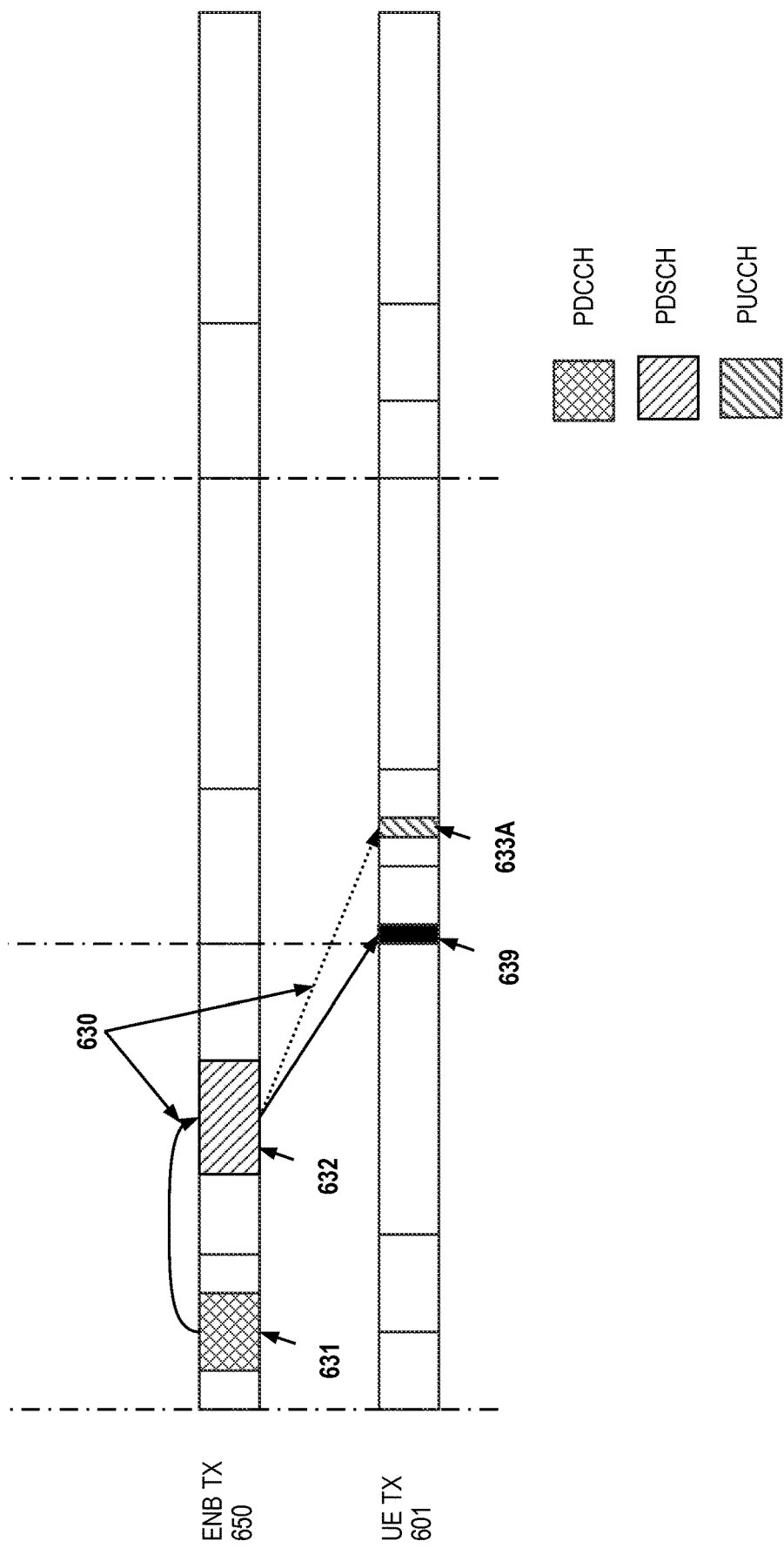
FIG. 6B illustrates aspects of intermediate HARQ-ACK operation in a system with early termination of repeated transmissions, according to certain embodiments.

FIG. 6B illustrates the use of an early or intermediate termination of retransmissions.

FIG. 6B shows a comparison of the transmission process associated with the HARQ process number 630 as illustrated in FIG. 6A with a system that additionally includes an option for early termination via an intermediate HARQ-ACK. As previously mentioned, scheduling occurs in the PDCCH 631 and transmission or retransmission of a block of data associated with the HARQ process number 630 occurs in the PDSCH 632. A standard HARQ-ACK or NACK using the PUCCH 633A is scheduled when the initial number of retransmissions is set. In embodiments described herein, however, an intermediate HARQ-ACK 639 may be transmitted prior to the scheduled time for the ACK/NACK for the PUCCH 633A. This intermediate HARQ-ACK 639 essentially preempts the standard HARQ-ACK/NACK of the PUCCH 633A. As mentioned, early termination is always an ACK rather than a NACK, since the HARQ-ACK 639 is transmitted in response to a determination that the data block from the PDSCH 632 has been successfully decoded, and any additional retransmissions scheduled between the timing of the HARQ-ACK 639 and the PUCCH 633A are therefore unnecessary. In FIG. 6B, a retransmission window as discussed above begins with the first transmission of a data block as part of the eNB TX 650, and ends with the time scheduled for the standard HARQ-ACK/NACK or with a threshold time period prior to the standard HARQ-ACK/NACK where early termination following the threshold time is deemed to be inefficient when compared with allowing the standard HARQ-ACK/NACK to be used. It will also be apparent that, while FIGS. 6A and 6B illustrate an embodiment with the eNB 650 TX transmitting data and the UE TX 601 transmitting the early termination of repeated transmissions message, a corresponding system may similarly operate with the UE TX 601 transmitting the data and the eNB TX 650 transmitting the intermediate HARQ-ACK as an early termination of repeated transmissions message. Similarly, some embodiments using DCI as described above may operate with timing that may be seen to be similar to the timing illustrated herein.

Also, in FIG. 6B, just as in FIG. 6A, although the PDSCH 632 is illustrated as a single continuous scheduled time, any number of separately scheduled retransmissions may be set between the time scheduled for the illustrated PDSCH 632 and the standard scheduled HARQ-ACK/NACK of the PUCCH 633A.

Additional detail related to scheduling of early termination of repeated transmissions within the context of standard HARQ-ACK/NACK scheduling is included below with respect to FIG. 9.

Figure 7:
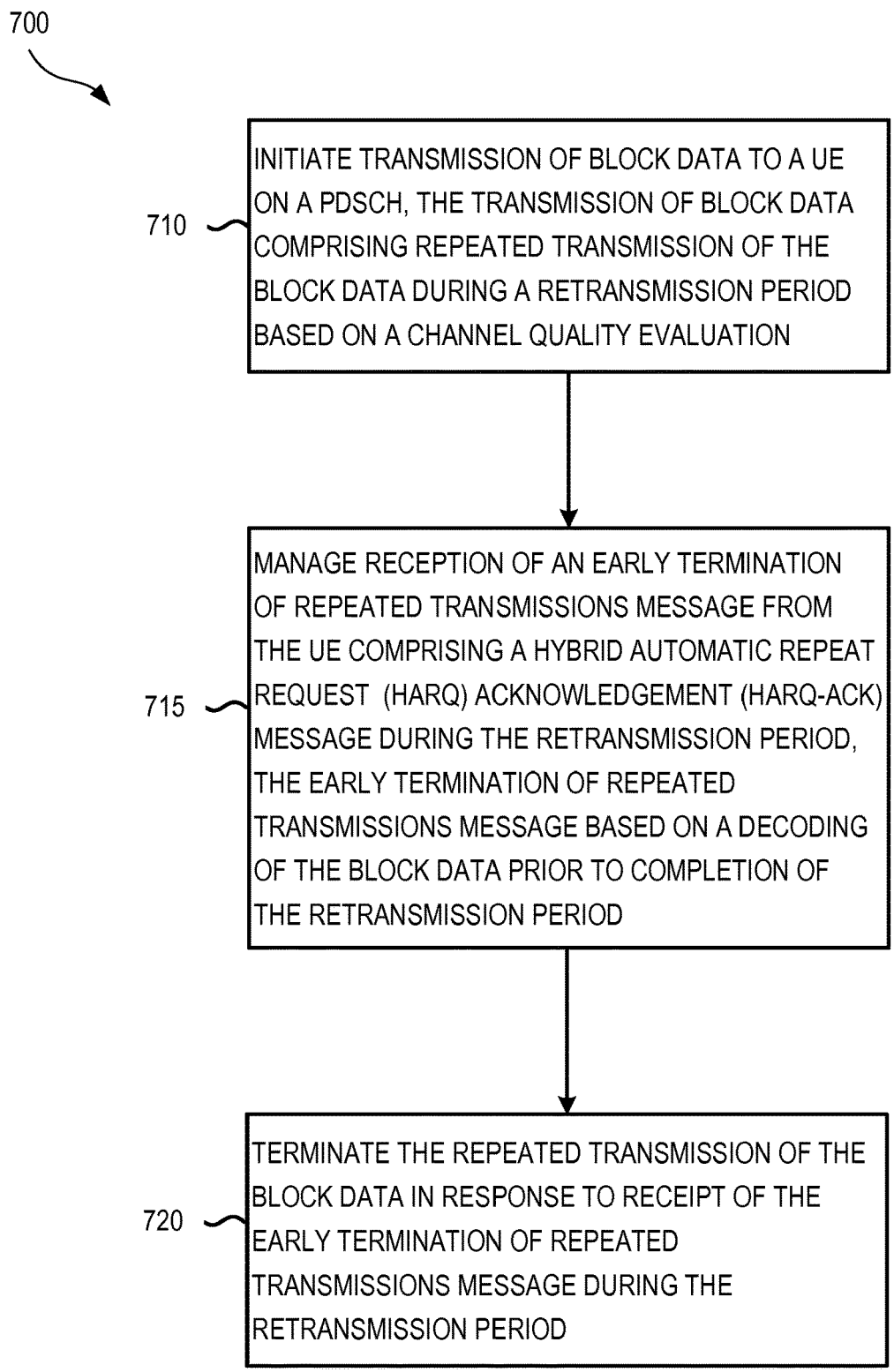
FIG. 7 describes a method for early termination of repeated transmissions, according to some example embodiments.

FIG. 7 describes a method 700 for early termination of retransmissions according some example embodiments. The method 700 may be performed by an eNB such as the eNB 150, 250, 550, or any eNB described herein. Additionally, it will be apparent that a corresponding method will be performed by the UE receiving the transmitted signals described in the method 700. Details of such operation are included in the examples below.

In the method 700, transmission of block data to a UE such as the UE 101, 201, or 501 on a PDSCH is initiated in operation 710, with the transmission of block data comprising repeated transmissions of the block data during a retransmission period based on a measured channel quality. The eNB then proceeds with repeated transmission as scheduled based on the set number of retransmissions over the retransmission period.

During the retransmission period, the eNB receives an early termination of repeated transmissions message from the UE as part of operation 715. The early termination message in operation 715 is a hybrid automatic repeat request (HARQ) acknowledgement (HARQ-ACK) message. This message is always an ACK and not a NACK, since the early termination is due to successful decoding of the message, and a NACK would indicate that the message had not been successfully received. A NACK would instead be communicated as part of a standard HARQ scheduled at the end of the retransmission period, but this standard HARQ is preempted by the intermediate HARQ-ACK received during the retransmission period. In operation 720, the eNB terminates at least one additional repetition of the repeated transmission of the block data in response to receipt of the early termination of repeated transmissions message during the retransmission period.

In addition to the above operations, an eNB may similarly perform operations to measure the channel quality in communication with the UE, and select a retransmission value based on the channel quality, associated with or used to generate the retransmission window. In some embodiments, the method may be performed by an eNB similar to the eNB 150, with transmit circuitry configured to communicate one or more transmissions of block data on a PDSCH to the UE during a retransmission window, and control circuitry configured to determine the channel quality associated with the PDSCH based on one or more measurements prior to communication of the one or more transmissions of the block data.

Figure 8:
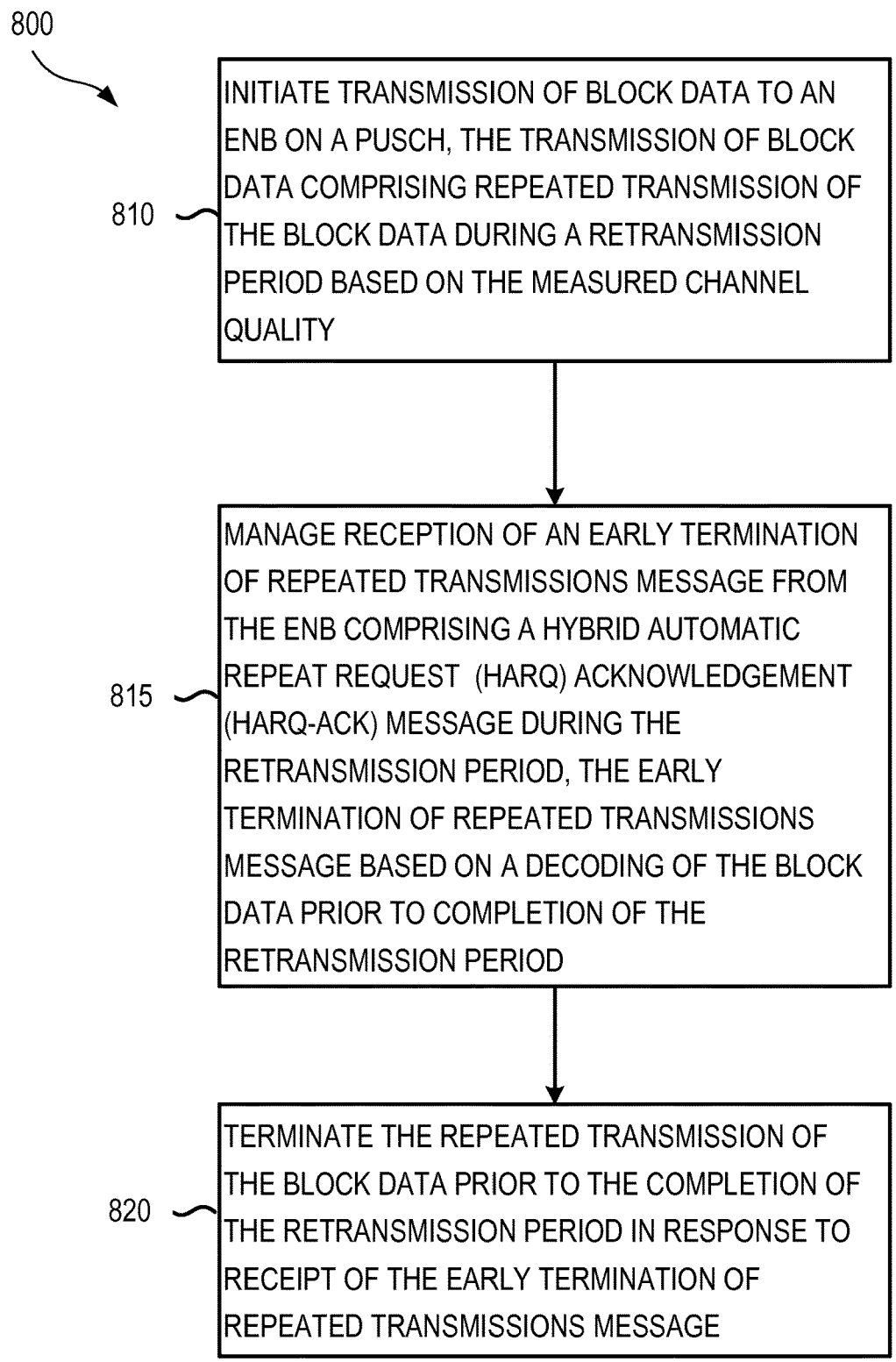
FIG. 8 describes a method for early termination of repeated transmissions, according to some example embodiments.

As mentioned above, the use of HARQ-ACK messages for early termination of repeated transmissions may work for both uplink and downlink channels. The method 700 of FIG. 7 describes early termination of repeated transmissions for a downlink channel. FIG. 8, by contrast, describes early termination of repeated transmissions for an uplink channel. This mirrors the operations described above, with the downlink PDSCH replaced with an uplink PUSCH, and the eNB and UE switching positions in the method.

Thus, in the method 800, transmission of block data to an eNB such as the eNB 150, 250, or 550 on a PUSCH is initiated in operation 810, with the transmission of block data comprising repeated transmissions of the block data during a retransmission period based on a measured channel quality. The UE then proceeds with repeated transmissions as scheduled based on the set number of retransmissions over the retransmission period.

During the retransmission period, the UE receives an early termination of repeated transmissions message from the eNB as part of operation 815. The early termination message in operation 815 is a HARQ-ACK message received due to successful decoding of the block data at the eNB. In operation 820, the UE terminates one or more additional repetitions of the repeated transmission of the block data in response to receipt of the early termination of repeated transmissions message during the retransmission period.

The channel measurements in some embodiments may be managed by the eNB for both the uplink and downlink early terminations. In some embodiments, the same channel measurements and the same quality values derived from these channel measurements may be used to set retransmission values and periods for both the uplink and downlink communications. During system operations, the eNB may manage updates or additional instances of such channel measurements, such that retransmission values and retransmission periods may change over time during system operation. In some embodiments, when the channel quality is sufficiently good, or quality values are above a predetermined threshold, early termination of repeated transmissions may be disabled due to a limited number of retransmissions and a corresponding limited benefit to early termination.

Figure 9:
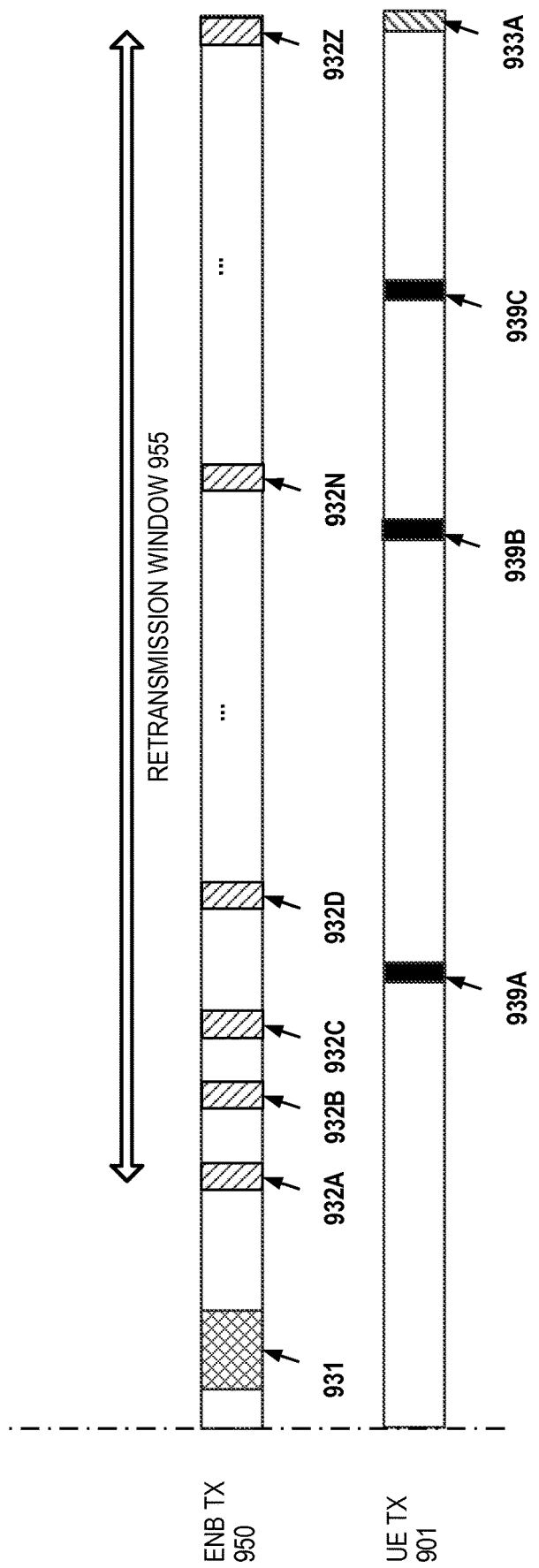
FIG. 9 illustrates aspects of intermediate HARQ-ACK operation in a system with early termination of repeated transmissions, according to certain embodiments.

FIG. 9 describes aspects of early termination. The transmission illustration of FIG. 9 is similar to the transmission illustration of FIG. 6B, but FIG. 9 explicitly shows multiple transmissions of a block of data from an eNB TX 950 occurring during PDSCH transmissions 932A-Z. In some embodiments, when channel quality data is used to set a retransmission window 955 and a channel 931 schedules a standard HARQ-ACK/NACK message 933 at the end of the retransmission window 955, the channel 931 may also be used to schedule optional intermediate HARQ-ACK messages 939A-C which act as messages for early termination of repeated transmissions. In such embodiments, rather than interrupting a transmission schedule after a data block is successfully decoded, the receiving device waits until the next scheduled HARQ-ACK message 939 following the successful decoding. This scheduled block is then used to send an early termination message. For example, if the UE decodes the data block successfully before the scheduled HARQ-ACK message 939A, then the UE TX 901 will transmit an early termination of repeated transmissions message to the eNB, and assuming that the message is received shortly thereafter, all retransmissions in the PDSCH transmissions 932D-Z will be canceled, freeing up resources for other transmissions.

If the UE decodes the data block after the timing for the scheduled HARQ-ACK message 939A has passed, but before the timing for the HARQ-ACK message 939B has passed, then then UE TX 901 will either skip transmission during the timing for the HARQ-ACK message 939A, or may use that transmission period for other data. The HARQ-ACK message 939B will be used, and if successfully transmitted, results in the PDSCH transmissions 932N-Z being canceled, with those resources freed for other transmissions.

If the UE does not decode the data block until after the timing for the scheduled HARQ-ACK message 939C, then the UE TX 901 will not send an early termination of repeated transmissions message, but will simply send the standard HARQ-ACK/NACK message 933A at the end of the retransmission window 955 indicating whether or not the data was successfully decoded.

In various embodiments, the HARQ-ACK message 939 scheduling may be managed in different ways. In one embodiment, a table or other specifically scheduled timing of pre-determined resources may be used within a retransmission window, such that a standard pattern is used for all transmissions that use early termination of repeated transmissions functionality.

In another embodiment, a device can transmit intermediate HARQ-ACK feedback on a PUCCH 1a/1b resource starting from the (n+4)th uplink subframe, where the downlink subframe n corresponds to the f*Nth (rounded up or down in different embodiments) repeated transmission of the PDSCH transport block, where N is the total number of repeated subframes for the transport block and the factor f is a value between zero and one.

In still further embodiments, multiple intermediate HARQ-ACK feedback scheduling instances can be set on a cell-specific or UE-specific basis. Given that PPUCCH transmissions carrying the intermediate HARQ-ACK messages 939 may need to be repeated across multiple subframes as well given channel conditions, some embodiments may be structured with the HARQ-ACK messages 939 spread sufficiently to avoid collisions. In other words, the HARQ-ACK message 939A should be sufficiently separated from the HARQ-ACK message 939B to avoid collisions given repeated transmissions of the message.

For UE-specific configuration, the number and the location, given by the factor f with 0<f<1, for scheduled intermediate HARQ-ACK feedback within a retransmission window can be configured explicitly or be specified as a function of the EC level set for a UE operating in EC mode.

In order to avoid resource collisions between the regular HARQ-ACK transmissions (e.g. standard HARQ-ACK/NACK message 933A) and intermediate HARQ-ACK transmissions (e.g. intermediate HARQ-ACK messages 939A-C) in a PUCCH, in some embodiments, separate regions can be defined via configuration of different PUCCH starting offsets. In some embodiments, N(1)PUCCH values or transmissions using the starting offset value N(1)PUCCH_interm my operate where this parameter is configured in a cell-specific or UE-specific manner using higher layer signaling. In some embodiments, a starting CCE of the original downlink control channel transmission carrying the downlink scheduling assignment or nCCE can be used for this offset.

In embodiments with multiple intermediate HARQ-ACK feedback reporting instances occurring with overlapping retransmission windows, multiple starting offsets are configured corresponding to each data transmission and associated HARQ-ACK feedback to avoid PUCCH resource collision between different UEs transmitting different instances of intermediate HARQ-ACK feedback.

Example 1 is an apparatus of an evolved node B (eNB) for machine-type communications (MTC) comprising: receive circuitry configured to receive one or more transmissions of block data on a Physical Uplink Shared Channel (PUSCH) from a first user equipment (UE) during a retransmission window; control circuitry configured to: determine that the block data has been successfully decoded at the eNB using the one or more transmissions of the block data; and generate an early termination of repeated transmissions message comprising a downlink control information (DCI) message; and transmit circuitry configured to transmit the early termination of repeated transmissions message during the retransmission window.

In Example 2, the subject matter of Example 1 optionally includes wherein the control circuitry is further configured to: determine a channel quality associated with the PUSCH based on one or more measurements prior to reception of the one or more transmissions of the block data; and select a retransmission value based on the channel quality, wherein the retransmission value is associated with the retransmission window.

In Example 3, the subject matter of any one or more of Examples 1-2 optionally includes wherein the DCI message comprises a DCI format 0 message comprising: CRC parity bits scrambled with a C-RNTI; and a new data indicator (NDI) value set to 0.

In Example 4, the subject matter of Examples 1-3 optionally includes wherein the DCI format 0 message further comprises: a TPC command for the PUSCH set to 00; a cyclic shift DM RS set to CS_val; a modulation and coding scheme redundancy version set to 11111; and a resource block assignment and hopping resource allocation value comprising all '1's.

In Example 5, the subject matter of any one or more of Examples 1-4 optionally includes wherein the eNB is configured to receive data from a plurality of transport blocks on the PUSCH during the retransmission window; wherein the block data is associated with a first transport block of the plurality of transport blocks; and wherein the control circuitry is configured to associate the block data with the early termination of repeated transmissions message based on a timing relationship between a first subframe of the one or more transmissions of the block data and a first subframe of the early termination of repeated transmissions message.

In Example 6, the subject matter of any one or more of Examples 1-5 optionally includes wherein the eNB is configured to receive data from a plurality of transport blocks on the PUSCH during the retransmission window; wherein the block data is associated with a first transport block of the plurality of transport blocks; wherein the control circuitry is configured to associate each of the plurality of transport blocks with a hybrid automatic repeat request (HARQ) acknowledgement (HARQ-ACK) process number; and wherein the DCI message comprises a first HARQ-ACK process number associated with the first transport block.

In Example 7, the subject matter of Example 6 optionally includes wherein the DCI message further comprises a cyclic shift bit field and a new data indicator (NDI).

In Example 8, the subject matter of any one or more of Examples 1-7 optionally includes wherein the eNB is configured to communicate with the first UE in a half-duplex frequency division duplex (HD-FDD) operation mode such that the PUSCH is interspersed with downlink subframes during the retransmission window.

In Example 9, the subject matter of any one or more of Examples 1-8 optionally includes wherein the transmit circuitry is further configured to communicate one or more transmissions of second block data on a Physical Downlink Shared Channel (PDSCH) to the first user equipment (UE) during a second retransmission window; and wherein the control circuitry is further configured to: initiate transmission of the second block data to the first UE on the PDSCH, the transmission of the second block data comprising repeated transmission of the second block data during the second retransmission window; manage reception of a second early termination of repeated transmissions message from the first UE comprising a hybrid automatic repeat request (HARQ) acknowledgement (HARQ-ACK) message during the second retransmission window, the second early termination of repeated transmissions message based on a second decoding of the second block data at the first UE prior to completion of the second retransmission window; and terminate the repeated transmission of the second block data in response to receipt of the second early termination of repeated transmissions message during the second retransmission window.

In Example 10, the subject matter of Example 9 optionally includes wherein the retransmission window and the second retransmission window are both determined based on a same first channel quality measurement.

In Example 11, the subject matter of any one or more of Examples 1-10 optionally includes wherein the HARQ-ACK message consists of a positive acknowledgement message.

In Example 12, the subject matter of any one or more of Examples 1-11 optionally includes wherein the second retransmission window is based on a selected number of subframe retransmissions.

In Example 13, the subject matter of any one or more of Examples 1-12 optionally includes wherein the PDSCH is associated with HARQ-ACK feedback scheduled on a physical uplink control channel (PUCCH) starting from an (n+4)th upload subframe of the second block data in the PDSCH, wherein a downlink subframe n corresponds to (f*N) where N is a selected number of subframe retransmissions and 0<f<1.

In Example 14, the subject matter of Example 13 optionally includes wherein the HARQ-ACK feedback scheduled on the PUCCH is associated with a plurality of subframes; wherein a first subframe of the plurality of subframes is based on a first n where f=0.25; wherein a second subframe of the plurality of subframes is based on a second n where f=0.5; and wherein a third subframe of the plurality of subframes is based on a third n where f=0.75.

In Example 15, the subject matter of any one or more of Examples 1-14 optionally includes wherein the receive circuitry is further configured to receive one or more transmissions of third block data on a second Physical Uplink Shared Channel (PUSCH) from the first user equipment (UE) during a third retransmission window; wherein the control circuitry is further configured to: determine that the third block data has been successfully decoded at the eNB using the one or more transmissions of the third block data; and generate a third early termination of repeated transmissions message comprising a second hybrid automatic repeat request (HARQ) acknowledgement (HARQ-ACK) message; and wherein the transmit circuitry is further configured to transmit the third early termination of repeated transmissions message during the third retransmission window.

Example 16 is a non-transitory computer readable medium comprising instructions that, when executed by one or more processors, configure an evolved node B (eNB) for machine-type communications (MTC) comprising: determining a channel connection quality to a user equipment (UE) based on one or more measurements associated with a Physical Uplink Shared Channel (PUSCH); selecting a retransmission value based on the channel quality, wherein the retransmission value is associated with a retransmission window; receiving one or more transmissions of block data on the PUSCH from the UE during the retransmission window; determining that the block data has been successfully decoded at the eNB using the one or more transmissions of the block data; and transmitting an early termination of repeated transmissions message comprising a downlink control information (DCI) message during the retransmission window.

In Example 17, the subject matter of Example 16 optionally includes wherein the DCI message comprises a DCI format 0 message; and wherein the block data is associated with the early termination of repeated transmissions message based on a timing relationship between a first subframe of the one or more transmissions of the block data and a first subframe of the early termination of repeated transmissions message.

In Example 18, the subject matter of any one or more of Examples above optionally includes wherein the DCI message comprises a custom DCI format comprising a hybrid automatic repeat request (HARQ) acknowledgement (HARQ-ACK) process number used to identify the block data.

Example 19 is an apparatus of an evolved node B (eNB) for machine-type communications (MTC) comprising: receive circuitry configured to receive one or more transmissions of block data on a Physical Uplink Shared Channel (PUSCH) from a first user equipment (UE) during a retransmission window; control circuitry configured to: determine a channel quality associated with the PUSCH based on one or more measurements prior to reception of the one or more transmissions of the block data; select a retransmission value based on the channel quality, wherein the retransmission value is associated with the retransmission window; determine that the block data has been successfully decoded at the eNB using the one or more transmissions of the block data; and generate an early termination of repeated transmissions message comprising a hybrid automatic repeat request (HARQ) acknowledgement (HARQ-ACK) message; and transmit circuitry configured to transmit the early termination of repeated transmissions message during the retransmission window.

In Example 20, the subject matter of any Examples above optionally includes wherein the retransmission window is based on a selected number of subframe retransmissions; and wherein the PUSCH is associated with periodic intermediate HARQ-ACK feedback scheduled on a physical uplink control channel (PUCCH) starting from an (n+4)th upload subframe of the block data in the PDSCH, wherein a downlink subframe n corresponds to (f*N) where N is a selected number of subframe retransmissions and 0<f<1.

In Example 21, the subject matter of any one or more of Examples q-20 optionally includes wherein the eNB is configured to schedule periodic intermediate HARQ-ACK feedback in a cell-specific or UE-specific manner to avoid collisions with regular HARQ-ACK feedback.

In Example 22, the subject matter of Examples 1-21 optionally includes wherein the periodic intermediate HARQ-ACK feedback is scheduled via higher layer signaling.

In Example 23, the subject matter of Examples 1-22 optionally includes wherein PUCCH resources for the periodic intermediate HARQ-ACK feedback are derived from a starting CCE index of an initial downlink control channel transmission carrying a downlink scheduling assignment.

In Example 24, the subject matter of Examples 1-23 optionally includes wherein the cell-specific or UE-specific scheduling manner is based on varied starting offsets configured corresponding to each instance of the periodic intermediate HARQ-ACK feedback to avoid PUCCH resource collisions between different UEs communicating with the eNB.

Example 25 is a non-transitory computer readable medium comprising instructions that, when executed by one or more processors, configure an evolved node B (eNB) for machine-type communications (MTC) comprising: determining a channel connection quality to a user equipment (UE) based on one or more measurements associated with a Physical Uplink Shared Channel (PUSCH); selecting a retransmission value based on the channel quality, wherein the retransmission value is associated with a retransmission window; receiving one or more transmissions of block data on the PUSCH from the UE during the retransmission window; determining that the block data has been successfully decoded at the eNB using the one or more transmissions of the block data; and transmitting an early termination of repeated transmissions message comprising a hybrid automatic repeat request (HARQ) acknowledgement (HARQ-ACK) message during the retransmission window.

Example 26 is an apparatus of an evolved node B (eNB) for machine-type communications (MTC) comprising: transmit circuitry configured to communicate one or more transmissions of block data on a Physical Downlink Shared Channel (PDSCH) to a first user equipment (UE) during a retransmission window; control circuitry configured to: determine a channel quality associated with the PDSCH based on one or more measurements prior to communication of the one or more transmissions of the block data; select a retransmission value based on the channel quality, wherein the retransmission value is associated with the retransmission window; initiate transmission of the block data to the first UE on the PDSCH, the transmission of the block data comprising repeated transmission of the block data during the retransmission window based on the measured channel quality; manage reception of an early termination of repeated transmissions message from the first UE comprising a hybrid automatic repeat request (HARQ) acknowledgement (HARQ-ACK) message during the retransmission window, the early termination of repeated transmissions message based on a decoding of the block data prior to completion of the retransmission window; and terminate the repeated transmission of the block data in response to receipt of the early termination of repeated transmissions message during the retransmission window.

Example 27 is an apparatus of a user equipment (UE) for machine-type communications (MTC) comprising: receive circuitry configured to receive retransmission information from an evolved node B (eNB) associated with a measured channel quality for a Physical Uplink Shared Channel (PUSCH); and control circuitry configured to: initiate transmission of block data to the eNB on the PUSCH, the transmission of the block data comprising repeated transmission of the block data during a retransmission window based on the measured channel quality; receive an early termination of repeated transmissions message comprising a downlink control information (DCI) format 0 message; and terminate the repeated transmission of the block data in response to receipt of the early termination of repeated transmissions message during the retransmission window.

Example 28 is an apparatus of a user equipment (UE) for machine-type communications (MTC) comprising: receive circuitry configured to receive retransmission information from an evolved node B (eNB) based on a measured channel quality associated with a Physical Uplink Shared Channel (PUSCH); and control circuitry configured to: initiate transmission of block data to the eNB on the PUSCH, the transmission of the block data comprising repeated transmission of the block data during a retransmission window based on the measured channel quality; manage reception of an early termination of repeated transmissions message comprising a hybrid automatic repeat request (HARQ) acknowledgement (HARQ-ACK) message during the retransmission window; and terminate the repeated transmission of the block data in response to receipt of the early termination of repeated transmissions message during the retransmission window.

Example 29 is an apparatus of a user equipment (UE) for machine-type communications (MTC) comprising: receive circuitry configured to: receive retransmission information from an evolved node B (eNB) based on a measured channel quality associated with a Physical Downlink Shared Channel (PDSCH); and receive one or more transmissions of block data on a Physical Uplink Shared Channel (PUSCH) from the eNB during a retransmission window; control circuitry configured to: determine that the block data has been successfully decoded at the UE using the one or more transmissions of the block data; and generate an early termination of repeated transmissions message comprising a hybrid automatic repeat request (HARQ) acknowledgement (HARQ-ACK) message in response to the determination that the block data has been successfully decoded; and transmit circuitry configured to transmit the early termination of repeated transmissions message to the eNB before the end of the retransmission window.

Example 30 is an apparatus of a user equipment (UE) for machine-type communications (MTC) comprising: control circuitry configured to: process retransmission information from an evolved node B (eNB) based on a measured channel quality associated with a Physical Downlink Shared Channel (PDSCH); and process one or more transmissions of block data on a Physical Uplink Shared Channel (PUSCH) from the eNB during a retransmission window; determine that the block data has been successfully decoded at the UE using the one or more transmissions of the block data; and generate, in response to the determination that the block data has been successfully decoded, an early termination of repeated transmissions message comprising a hybrid automatic repeat request (HARQ) acknowledgement (HARQ-ACK) message in response to the determination that the block data has been successfully decoded.

Example 31 is an embodiment as any example above with an apparatus comprising: receive circuitry coupled to an antenna and the control circuitry, the receive circuitry configured to receive the retransmission information and the block data from the antenna and communicate the retransmission information and the block data to the control circuitry; and transmit circuitry coupled to the antenna and the control circuitry, the transmit circuitry configured to transmit the early termination of repeated transmissions message to the eNB before the end of the retransmission window.

Further, in addition to the specific combinations of examples described above, any of the examples detailing further implementations of an element of an apparatus or medium may be applied to any other corresponding apparatus or medium, or may be implemented in conjunction with another apparatus or medium. Thus, each example above may be combined with each other example in various ways both as implementations in a system and as combinations of elements to generate an embodiment from the combination of each example or group of examples.

Figure 10:
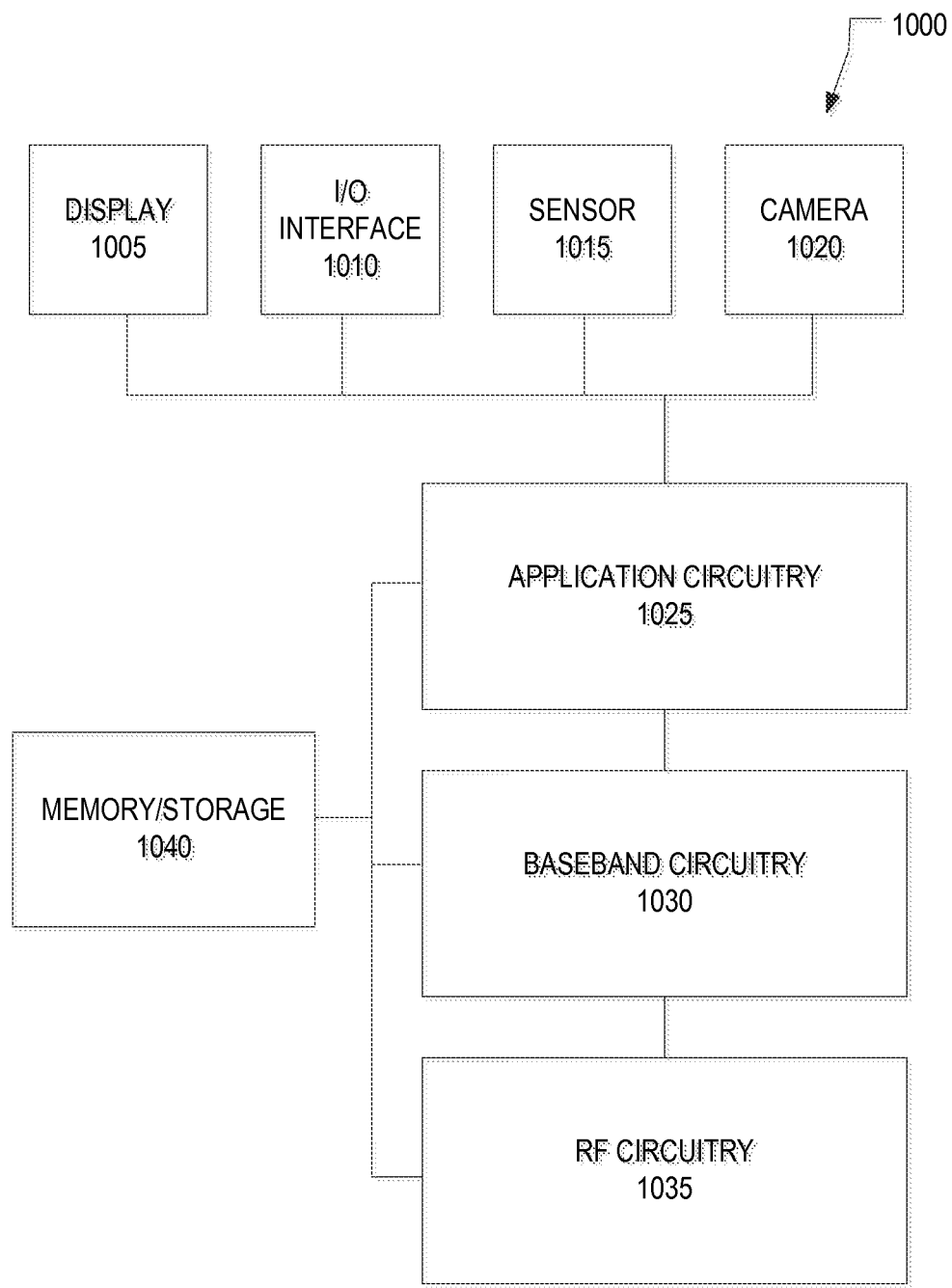
FIG. 10 illustrates aspects of a computing machine, according to some example embodiments.

FIG. 10 illustrates aspects of a computing machine according to some example embodiments. Embodiments described herein may be implemented into a system 1000 using any suitably configured hardware and/or software. FIG. 10 illustrates, for some embodiments, an example system 1000 comprising radio frequency (RF) circuitry 1035, baseband circuitry 1030, application circuitry 1025, memory/storage 1040, a display 1005, a camera 1020, a sensor 1015, and an input/output (I/O) interface 1010, coupled with each other at least as shown.

The application circuitry 1025 may include circuitry such as, but not limited to, one or more single-core or multi-core processors. The processor(s) may include any combination of general-purpose processors and dedicated processors (e.g., graphics processors, application processors, etc.). The processors may be coupled with the memory/storage 1040 and configured to execute instructions stored in the memory/storage 1040 to enable various applications and/or operating systems running on the system 1000.

The baseband circuitry 1030 may include circuitry such as, but not limited to, one or more single-core or multi-core processors. The processor(s) may include a baseband processor. The baseband circuitry 1030 may handle various radio control functions that enable communication with one or more radio networks via the RF circuitry 1035. The radio control functions may include, but are not limited to, signal modulation, encoding, decoding, radio frequency shifting, and the like. In some embodiments, the baseband circuitry 1030 may provide for communication compatible with one or more radio technologies. For example, in some embodiments, the baseband circuitry 1030 may support communication with an evolved universal terrestrial radio access network (EUTRAN), other wireless metropolitan area networks (WMANs), a wireless local area network (WLAN), or a wireless personal area network (WPAN). Embodiments in which the baseband circuitry 1030 is configured to support radio communications of more than one wireless protocol may be referred to as multi-mode baseband circuitry.

In various embodiments, the baseband circuitry 1030 may include circuitry to operate with signals that are not strictly considered as being in a baseband frequency. For example, in some embodiments, the baseband circuitry 1030 may include circuitry to operate with signals having an intermediate frequency, which is between a baseband frequency and a radio frequency.

The RF circuitry 1035 may enable communication with wireless networks using modulated electromagnetic radiation through a non-solid medium. In various embodiments, the RF circuitry 1035 may include switches, filters, amplifiers, and the like to facilitate the communication with the wireless network.

In various embodiments, the RF circuitry 1035 may include circuitry to operate with signals that are not strictly considered as being in a radio frequency. For example, in some embodiments, the RF circuitry 1035 may include circuitry to operate with signals having an intermediate frequency, which is between a baseband frequency and a radio frequency.

In various embodiments, the transmitter circuitry or receiver circuitry discussed above with respect to the UE or eNB may be embodied in whole or in part in one or more of the RF circuitry 1035, the baseband circuitry 1030, and/or the application circuitry 1025.

In some embodiments, some or all of the constituent components of a baseband processor may be used to implement aspects of any embodiment described herein. Such embodiments may be implemented by the baseband circuitry 1030, the application circuitry 1025, and/or the memory/storage 1040 may be implemented together on a system on a chip (SOC).

The memory/storage 1040 may be used to load and store data and/or instructions, for example, for the system 1000. The memory/storage 1040 for one embodiment may include any combination of suitable volatile memory (e.g., dynamic random access memory (DRAM)) and/or non-volatile memory (e.g., flash memory).

In various embodiments, the I/O interface 1010 may include one or more user interfaces designed to enable user interaction with the system 1000 and/or peripheral component interfaces designed to enable peripheral component interaction with the system 1000. User interfaces may include, but are not limited to, a physical keyboard or keypad, a touchpad, a speaker, a microphone, and so forth. Peripheral component interfaces may include, but are not limited to, a non-volatile memory port, a universal serial bus (USB) port, an audio jack, and a power supply interface.

In various embodiments, the sensor 1015 may include one or more sensing devices to determine environmental conditions and/or location information related to the system 1000. In some embodiments, the sensors 1015 may include, but are not limited to, a gyro sensor, an accelerometer, a proximity sensor, an ambient light sensor, and a positioning unit. The positioning unit may also be part of, or interact with, the baseband circuitry 1030 and/or RF circuitry 1035 to communicate with components of a positioning network (e.g., a global positioning system (GPS) satellite). In various embodiments, the display 1005 may include a display (e.g., a liquid crystal display, a touch screen display, etc.).

In various embodiments, the system 1000 may be a mobile computing device such as, but not limited to, a laptop computing device, a tablet computing device, a netbook, an ultrabook, a smartphone, and the like. In various embodiments, the system 1000 may have more or fewer components, and/or different architectures.

Figure 11:
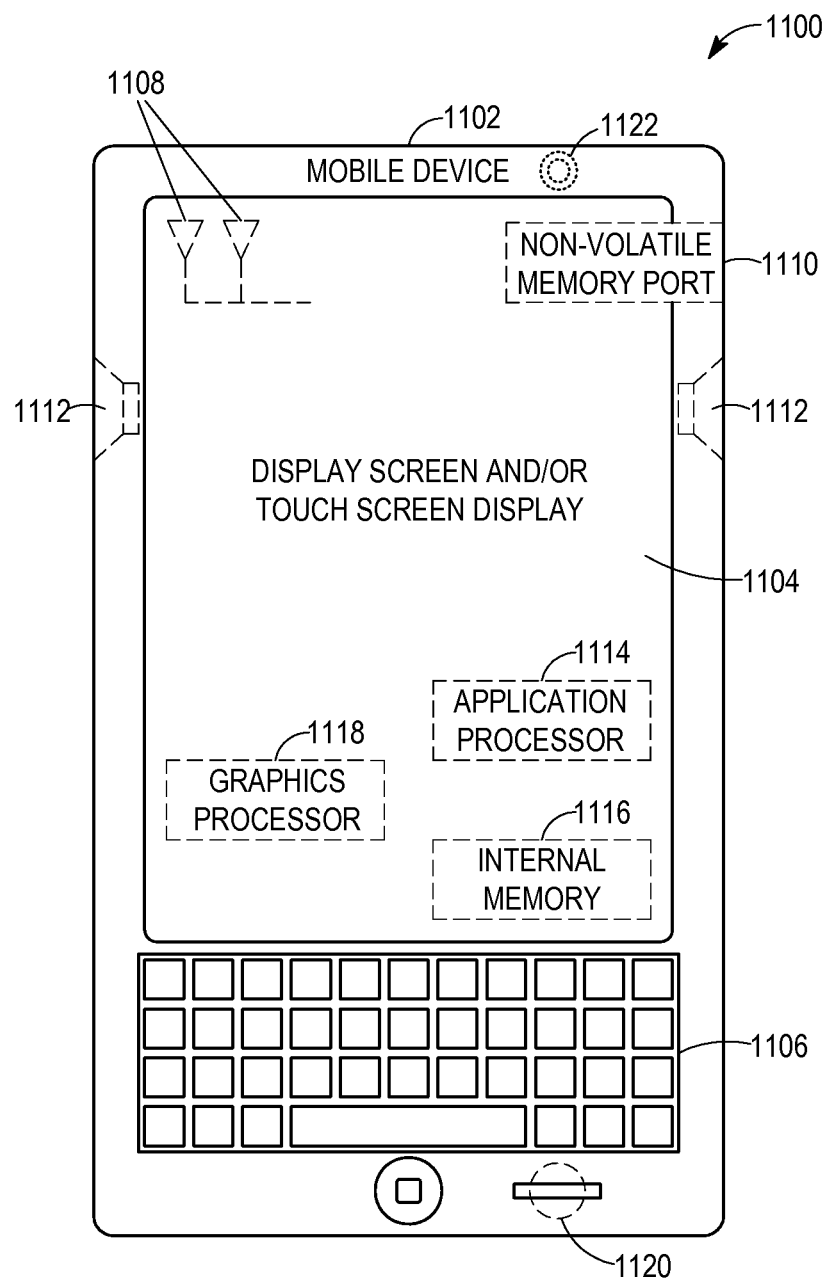
FIG. 11 illustrates aspects of a UE, in accordance with some example embodiments.

FIG. 11 shows an example UE, illustrated as a UE 1100. The UE 1100 may be an implementation of the UE 101, the eNB 150, or any device described herein. The UE 1100 can include one or more antennas configured to communicate with a transmission station, such as a base station (BS), an eNB, or another type of wireless wide area network (WWAN) access point. The UE 1100 can be configured to communicate using at least one wireless communication standard including 3GPP LTE, WiMAX, High Speed Packet Access (HSPA), Bluetooth, and WiFi. The UE 1100 can communicate using separate antennas for each wireless communication standard or shared antennas for multiple wireless communication standards. The UE 1100 can communicate in a WLAN, a WPAN, and/or a WWAN.

FIG. 11 also shows a microphone 1120 and one or more speakers 1112 that can be used for audio input and output to and from the UE 1100. A display screen 1104 can be a liquid crystal display (LCD) screen, or another type of display screen such as an organic light emitting diode (OLED) display. The display screen 1104 can be configured as a touch screen. The touch screen can use capacitive, resistive, or another type of touch screen technology. An application processor 1114 and a graphics processor 1118 can be coupled to an internal memory 1116 to provide processing and display capabilities. A non-volatile memory port 1110 can also be used to provide data I/O options to a user. The non-volatile memory port 1110 can also be used to expand the memory capabilities of the UE 1100. A keyboard 1106 can be integrated with the UE 1100 or wirelessly connected to the UE 1100 to provide additional user input. A virtual keyboard can also be provided using the touch screen. A camera 1122 located on the front (display screen) side or the rear side of the UE 1100 can also be integrated into the housing 1102 of the UE 1100.

Figure 12:
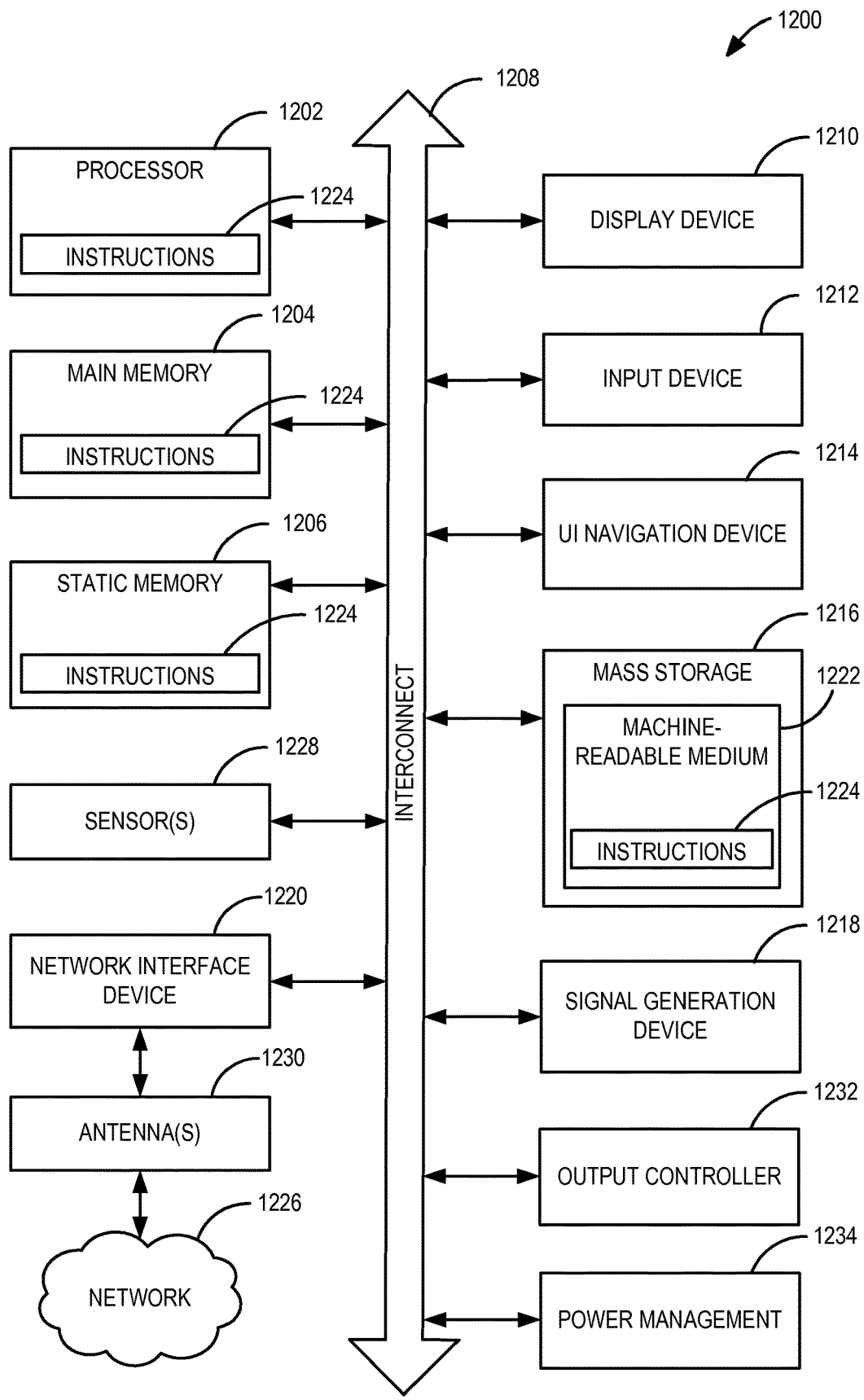
FIG. 12 is a block diagram illustrating an example computer system machine which may be used in association with various embodiments described herein.

FIG. 12 is a block diagram illustrating an example computer system machine 1200 upon which any one or more of the methodologies herein discussed can be run, and which may be used to implement the eNB 150, the UE 101, or any other device described herein. In various alternative embodiments, the machine operates as a standalone device or can be connected (e.g., networked) to other machines. In a networked deployment, the machine can operate in the capacity of either a server or a client machine in server-client network environments, or it can act as a peer machine in peer-to-peer (or distributed) network environments. The machine can be a personal computer (PC) that may or may not be portable (e.g., a notebook or a netbook), a tablet, a set-top box (STB), a gaming console, a Personal Digital Assistant (PDA), a mobile telephone or smartphone, a web appliance, a network router, switch, or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system machine 1200 includes a processor 1202 (e.g., a central processing unit (CPU), a graphics processing unit (GPU), or both), a main memory 1204, and a static memory 1206, which communicate with each other via an interconnect 1208 (e.g., a link, a bus, etc.). The computer system machine 1200 can further include a video display unit 1210, an alphanumeric input device 1212 (e.g., a keyboard), and a user interface (UI) navigation device 1214 (e.g., a mouse). In one embodiment, the video display unit 1210, input device 1212, and UI navigation device 1214 are a touch screen display. The computer system machine 1200 can additionally include a mass storage device 1216 (e.g., a drive unit), a signal generation device 1218 (e.g., a speaker), an output controller 1232, a power management controller 1234, a network interface device 1220 (which can include or operably communicate with one or more antennas 1230, transceivers, or other wireless communications hardware), and one or more sensors 1228, such as a GPS sensor, compass, location sensor, accelerometer, or other sensor.

The storage device 1216 includes a machine-readable medium 1222 on which is stored one or more sets of data structures and instructions 1224 (e.g., software) embodying or utilized by any one or more of the methodologies or functions described herein. The instructions 1224 can also reside, completely or at least partially, within the main memory 1204, static memory 1206, and/or processor 1202 during execution thereof by the computer system machine 1200, with the main memory 1204, the static memory 1206, and the processor 1202 also constituting machine-readable media.

While the machine-readable medium 1222 is illustrated in an example embodiment to be a single medium, the term "machine-readable medium" can include a single medium or multiple media (e.g., a centralized or distributed database, and/or associated caches and servers) that store the one or more instructions 1224. The term "machine-readable medium" shall also be taken to include any tangible medium that is capable of storing, encoding, or carrying instructions for execution by the machine and that cause the machine to perform any one or more of the methodologies of the present disclosure, or that is capable of storing, encoding, or carrying data structures utilized by or associated with such instructions.

The instructions 1224 can further be transmitted or received over a communications network 1226 using a transmission medium via the network interface device 1220 utilizing any one of a number of well-known transfer protocols (e.g., hypertext transfer protocol HTTP). The term "transmission medium" shall be taken to include any medium that is capable of storing, encoding, or carrying instructions for execution by the machine, and includes digital or analog communications signals or other intangible media to facilitate communication of such software.

Various techniques, or certain aspects or portions thereof, may take the form of program code (i.e., instructions) embodied in tangible media, such as floppy diskettes, CD-ROMs, hard drives, non-transitory computer readable storage media, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a RAM, Erasable Programmable Read-Only Memory (EPROM), flash drive, optical drive, magnetic hard drive, or other medium for storing electronic data. The base station and mobile station may also include a transceiver module, a counter module, a processing module, and/or a clock module or timer module. One or more programs that may implement or utilize the various techniques described herein may use an application programming interface (API), reusable controls, and the like. Such programs may be implemented in a high level procedural or object-oriented programming language to communicate with a computer system. However, the program(s) may be implemented in assembly or machine language, if desired. In any case, the language may be a compiled or interpreted language, and combined with hardware implementations.

Various embodiments may use 3GPP LTE/LTE-A, Institute of Electrical and Electronic Engineers (IEEE) 1202.11, and Bluetooth communication standards. Various alternative embodiments may use a variety of other WWAN, WLAN, and WPAN protocols and standards in connection with the techniques described herein. These standards include, but are not limited to, other standards from 3GPP (e.g., HSPA+, UMTS), IEEE 1202.16 (e.g., 1202.16p), or Bluetooth (e.g., Bluetooth 11.0, or like standards defined by the Bluetooth Special Interest Group) standards families. Other applicable network configurations can be included within the scope of the presently described communication networks. It will be understood that communications on such communication networks can be facilitated using any number of PANs, LANs, and WANs, using any combination of wired or wireless transmission mediums.

The embodiments described above can be implemented in one or a combination of hardware, firmware, and software. Various methods or techniques, or certain aspects or portions thereof, can take the form of program code (i.e., instructions) embodied in tangible media, such as flash memory, hard drives, portable storage devices, read-only memory (ROM), RAM, semiconductor memory devices (e.g., EPROM, Electrically Erasable Programmable Read-Only Memory (EEPROM)), magnetic disk storage media, optical storage media, and any other machine-readable storage medium or storage device wherein, when the program code is loaded into and executed by a machine, such as a computer or networking device, the machine becomes an apparatus for practicing the various techniques.

It should be understood that the functional units or capabilities described in this specification may have been referred to or labeled as components or modules in order to more particularly emphasize their implementation independence. For example, a component or module can be implemented as a hardware circuit comprising custom very-large-scale integration (VLSI) circuits or gate arrays, off-the-shelf semiconductors such as logic chips, transistors, or other discrete components. A component or module can also be implemented in programmable hardware devices such as field programmable gate arrays, programmable array logic, programmable logic devices, or the like. Components or modules can also be implemented in software for execution by various types of processors. An identified component or module of executable code can, for instance, comprise one or more physical or logical blocks of computer instructions, which can, for instance, be organized as an object, procedure, or function. Nevertheless, the executables of an identified component or module need not be physically located together, but can comprise disparate instructions stored in different locations which, when joined logically together, comprise the component or module and achieve the stated purpose for the component or module.

Indeed, a component or module of executable code can be a single instruction, or many instructions, and can even be distributed over several different code segments, among different programs, and across several memory devices. Similarly, operational data can be identified and illustrated herein within components or modules, and can be embodied in any suitable form and organized within any suitable type of data structure. The operational data can be collected as a single data set, or can be distributed over different locations including over different storage devices, and can exist, at least partially, merely as electronic signals on a system or network. The components or modules can be passive or active, including agents operable to perform desired functions.

What is claimed is:

1. A base station, comprising:
a radio; and
a processor operably connected to the radio and configured to cause the base station to:
during machine-type communications (MTC):
receive one or more transmissions of block data on a Physical Uplink Shared Channel (PUSCH) from a first user equipment (UE) during a retransmission window;
determine that the block data has been successfully decoded using the one or more transmissions of the block data;
generate an early termination of repeated transmissions message for the block data following determination of successful decoding, the early termination of repeated transmissions message comprising a downlink control information (DCI) message, wherein the DCI message comprises a resource block assignment set to all '1's; and
transmit the early termination of repeated transmissions message during the retransmission window.

2. The base station of claim 1, wherein the DCI message further comprises a transmit power command, TPC, set to zero.

3. The base station of claim 1, wherein the DCI message comprises a DCI format 0 message comprising:
cyclic redundancy check, CRC, parity bits scrambled with a cell radio network temporary identifier, C-RNTI; and
a new data indicator, NDI, value set to 0.

4. The base station of claim 1, wherein the DCI message further comprises:
a cyclic shift of demodulation reference signals, DM RS, set to CS_val;
a modulation and coding scheme redundancy version set to 11111; or
a hopping resource allocation value comprising all '1's.

5. The base station of claim 1, wherein the processor is further configured to cause the base station to:
receive data from a plurality of transport blocks on the PUSCH during the retransmission window, wherein the block data is associated with a first transport block of the plurality of transport blocks.

6. The base station of claim 5,
wherein the block data is associated with a first transport block of the plurality of transport blocks;
wherein the processor is further configured to cause the base station to associate each of the plurality of transport blocks with a hybrid automatic repeat request acknowledgement (HARQ-ACK) process number, wherein the DCI message comprises a first HARQ-ACK process number associated with the first transport block.

7. A user equipment device (UE) comprising:
a radio; and
a processor operably connected to the radio and configured to cause the UE to:
during machine-type communications (MTC):
transmit, to a base station, one or more transmissions of block data on a Physical Uplink Shared Channel (PUSCH) during a retransmission window;

receive, from the base station, an early termination of repeated transmissions message for the block data, the early termination of repeated transmissions message comprising a downlink control information (DCI) message, wherein the DCI message comprises a resource block assignment set to all '1's; and terminate transmissions of the block data in response to the early termination of repeated transmissions message.

8. The UE of claim 7, wherein the DCI message further comprises a transmit power command (TPC) set to zero.

9. The UE of claim 7, wherein the DCI message comprises a DCI format 0 message comprising:

cyclic redundancy check (CRC) parity bits scrambled with a cell radio network temporary identifier (C-RNTI); and a new data indicator (NDI) value set to 0.

10. The UE of claim 7, wherein the DCI message further comprises:

a cyclic shift of demodulation reference signals, DM RS, set to CS_val;

a modulation and coding scheme redundancy version set to 11111; or a hopping resource allocation value comprising all '1's.

11. The UE of claim 7, wherein the processor is further configured to cause the UE to:

transmit, to the base station, data from a plurality of transport blocks on the PUSCH during the retransmission window, wherein the block data is associated with a first transport block of the plurality of transport blocks.

12. The UE of claim 11, wherein the block data is associated with a first transport block of the plurality of transport blocks, wherein the DCI message comprises a first hybrid automatic repeat request acknowledgement (HARQ-ACK) process number associated with the first transport block.

13. The UE of claim 7, wherein the processor is further configured to cause the UE to communicate with the base station in a half-duplex frequency division duplex (HD-FDD) operation mode such that the PUSCH is interspersed with downlink subframes during the retransmission window.

14. An apparatus, comprising:

a processor configured to cause a user equipment device, UE, to:

during machine-type communications (MTC):

transmit, to a base station, one or more transmissions of block data on a Physical Uplink Shared Channel (PUSCH) during a retransmission window;

receive, from the base station, an early termination of repeated transmissions message for the block data, the early termination of repeated transmissions message comprising a downlink control information (DCI) message, wherein the DCI message comprises a resource block assignment set to all '1's; and terminate transmissions of the block data in response to the early termination of repeated transmissions message.

15. The apparatus of claim 14, wherein the DCI message further comprises a transmit power command (TPC) set to zero.

16. The apparatus of claim 14, wherein the DCI message comprises a DCI format 0 message comprising:

cyclic redundancy check (CRC) parity bits scrambled with a cell radio network temporary identifier (C-RNTI); and a new data indicator (NDI) value set to 0.

17. The apparatus of claim 14, wherein the DCI message further comprises:

a cyclic shift of demodulation reference signals, DM RS, set to CS_val;

a modulation and coding scheme redundancy version set to 11111; or a hopping resource allocation value comprising all '1's.

18. The apparatus of claim 14, wherein the processor is further configured to cause the UE to:

transmit, to the base station, data from a plurality of transport blocks on the PUSCH during the retransmission window, wherein the block data is associated with a first transport block of the plurality of transport blocks.

19. The apparatus of claim 18, wherein the block data is associated with a first transport block of the plurality of transport blocks, wherein the DCI message comprises a first hybrid automatic repeat request acknowledgement (HARQ-ACK) process number associated with the first transport block.

20. The apparatus of claim 14, wherein the processor is further configured to cause the UE to communicate with the base station in a half-duplex frequency division duplex (HD-FDD) operation mode such that the PUSCH is interspersed with downlink subframes during the retransmission window.

* * * * *